United States Patent
Mores et al.

(10) Patent No.: US 11,052,998 B2
(45) Date of Patent: Jul. 6, 2021

(54) MULTIROTOR ELECTRIC AIRCRAFT WITH REDUNDANT SECURITY ARCHITECTURE

(71) Applicant: AIRBUS HELICOPTERS DEUTSCHLAND GMBH, Donauwörth (DE)

(72) Inventors: Sebastian Mores, Munich (DE); Christoph Geyer, Augsburg (DE); Stefan Haisch, Harburg (DE); Marius Bebesel, Augsburg (DE); Michael Geiss, Moettingen (DE); Manfred Bernhard, Aystetten (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 514 days.

(21) Appl. No.: 16/063,768

(22) PCT Filed: Dec. 16, 2016

(86) PCT No.: PCT/EP2016/081574
§ 371 (c)(1),
(2) Date: Jun. 19, 2018

(87) PCT Pub. No.: WO2017/108634
PCT Pub. Date: Jun. 29, 2017

(65) Prior Publication Data
US 2020/0283134 A1   Sep. 10, 2020

(30) Foreign Application Priority Data
Dec. 21, 2015  (EP) .................................. 15400058

(51) Int. Cl.
*B64C 27/20*   (2006.01)
*B60L 50/60*   (2019.01)
(Continued)

(52) U.S. Cl.
CPC .............. *B64C 27/20* (2013.01); *B60L 50/60* (2019.02); *B64C 27/10* (2013.01); *B64D 27/24* (2013.01);
(Continued)

(58) Field of Classification Search
CPC ......... B64C 27/20; B64C 27/10; B60L 50/60; B60L 2200/10; B64D 27/24
See application file for complete search history.

(56) References Cited

U.S. PATENT DOCUMENTS 4,071,207 A * 1/1978 Piasecki .............. B64C 29/0025
                                                180/118
6,568,630 B2   5/2003 Yoeli
(Continued)

FOREIGN PATENT DOCUMENTS

CA       2315524 A1    5/2001
CN       201306711 Y   9/2009
(Continued)

OTHER PUBLICATIONS

International Search Report for European Application No. PCT/EP2016/081574, Completed by the European Patent Office, Dated Mar. 21, 2017, 14 pages.
(Continued)

*Primary Examiner* — Assres H Woldemaryam
(74) *Attorney, Agent, or Firm* — Brooks Kushman P.C.

(57) ABSTRACT

A multirotor aircraft with at least two thrust producing units, the multirotor aircraft being adapted for transportation of passengers and comprising an aircraft operating structure that is adapted for operation of the multirotor aircraft in failure-free operating mode, and a redundant security architecture that is at least adapted for operation of the multirotor aircraft in case of a failure of the aircraft operating structure in operation, the redundant security architecture being pro-
(Continued)

vided to comply with applicable authority regulations and certification requirements regarding passenger transportation.

21 Claims, 10 Drawing Sheets

(51) Int. Cl.
    *B64C 27/10* (2006.01)
    *B64D 27/24* (2006.01)
(52) U.S. Cl.
    CPC ....... *B60L 2200/10* (2013.01); *B64D 2221/00* (2013.01)

(56) References Cited

U.S. PATENT DOCUMENTS

| | | | |
|---|---|---|---|
| 7,857,253 B2 | 12/2010 | Yoeli | |
| 7,946,528 B2 | 5/2011 | Yoeli | |
| 8,128,033 B2* | 3/2012 | Raposo | B64C 29/0033 244/171.2 |
| 8,322,648 B2* | 12/2012 | Kroetsch | A63H 27/12 244/17.23 |
| D678,169 S | 3/2013 | Kennelly et al. | |
| 8,393,564 B2 | 3/2013 | Kroo | |
| 8,485,464 B2 | 7/2013 | Kroo | |
| 8,733,690 B2 | 5/2014 | Bevirt et al. | |
| 8,794,566 B2 | 8/2014 | Hutson | |
| D761,690 S * | 7/2016 | Friesmuth | D12/16.1 |
| 2003/0094537 A1* | 5/2003 | Austen-Brown | B64C 29/0033 244/7 R |
| 2006/0226281 A1* | 10/2006 | Walton | B64C 29/0033 244/17.23 |
| 2007/0034738 A1 | 2/2007 | Sanders, Jr. et al. | |
| 2010/0301168 A1 | 12/2010 | Raposo | |
| 2011/0226892 A1 | 9/2011 | Crowther et al. | |
| 2012/0012692 A1 | 1/2012 | Kroo | |
| 2012/0091257 A1* | 4/2012 | Wolff | B64C 29/0033 244/12.4 |
| 2013/0118856 A1 | 5/2013 | Long | |
| 2014/0034775 A1* | 2/2014 | Hutson | B64C 27/006 244/17.17 |
| 2014/0097290 A1 | 4/2014 | Leng | |
| 2014/0339372 A1* | 11/2014 | Dekel | B64C 39/024 244/7 R |
| 2014/0367509 A1 | 12/2014 | Smith | |
| 2015/0012154 A1* | 1/2015 | Senkel | B64C 25/34 701/4 |
| 2015/0060606 A1 | 3/2015 | Wang et al. | |
| 2015/0127209 A1 | 5/2015 | Al-Gami et al. | |
| 2015/0266571 A1* | 9/2015 | Bevirt | B64C 29/0033 244/7 C |
| 2016/0207625 A1* | 7/2016 | Judas | B64C 29/0025 |
| 2016/0311529 A1* | 10/2016 | Brotherton-Ratcliffe | B64D 35/06 |
| 2016/0347447 A1* | 12/2016 | Judas | B64C 39/024 |
| 2017/0233069 A1* | 8/2017 | Apkarian | B64C 39/024 244/7 R |
| 2018/0141652 A1* | 5/2018 | Deslypper | B64C 3/38 |

FOREIGN PATENT DOCUMENTS

| | | |
|---|---|---|
| CN | 201932359 U | 8/2011 |
| CN | 203047531 U | 7/2013 |
| CN | 103387052 A | 11/2013 |
| CN | 104176249 A | 12/2014 |
| CN | 104859853 A | 8/2015 |
| DE | 102005022706 A1 | 11/2006 |
| DE | 102013108207 A1 | 2/2015 |
| EP | 2075459 A2 | 7/2009 |
| EP | 2551190 A1 | 1/2013 |
| EP | 2551193 A1 | 1/2013 |
| EP | 2551198 A1 | 1/2013 |
| EP | 2 604 519 A1 | 6/2013 |
| EP | 2234883 B1 | 8/2017 |
| FR | 2993859 A1 | 1/2014 |
| GB | 905911 | 9/1962 |
| JP | S61-54352 A | 3/1986 |
| JP | 2002-370696 A | 12/2002 |
| JP | 2009-78745 A | 4/2009 |
| JP | 2010-75568 A | 4/2010 |
| JP | 2013-79034 A | 5/2013 |
| JP | 2013-129301 A | 7/2013 |
| JP | 2013-531573 A | 8/2013 |
| JP | 2013-532601 A | 8/2013 |
| JP | 2014-520726 A | 8/2014 |
| JP | 2014-528382 A | 10/2014 |
| JP | 2014-227155 A | 12/2014 |
| JP | 3201100 U | 11/2015 |
| KR | 101451646 B1 | 10/2014 |
| WO | 0064736 A1 | 11/2000 |
| WO | 2004065208 A2 | 8/2004 |
| WO | 2007/141795 A1 | 12/2007 |
| WO | 2009077968 A2 | 6/2009 |
| WO | 2011/149544 A1 | 12/2011 |
| WO | 2014195660 A1 | 12/2014 |
| WO | 2015028627 A1 | 3/2015 |
| WO | 2015/092389 A1 | 6/2015 |
| WO | 2015/168320 A1 | 11/2015 |

OTHER PUBLICATIONS

Japanese Office Action dated Jul. 25, 2019, Application No. 2018-529122, Application No. 2018-529122, 9 Pages.

Chinese First Office Action & Search Report dated Nov. 27, 2020 (with English Machine Translation), Application No. 201680074972.2, Applicant Airbus Helicopters Deutschland GMBH, 26 Pages.

* cited by examiner

MULTIROTOR ELECTRIC AIRCRAFT WITH REDUNDANT SECURITY ARCHITECTURE

CROSS-REFERENCE TO RELATED APPLICATIONS

This application is the U.S. National Phase of PCT Application No. PCT/EP2016/081574 filed Dec. 16, 2016, which claims priority to European Application No. EP 15400058.2 filed Dec. 21, 2015, the disclosures of which are incorporated in their entirety by reference.

BACKGROUND OF THE INVENTION

(1) Field of the Invention

The invention is related to a multirotor aircraft with at least two thrust producing units, i.e. a rotorcraft having for instance four, six, ten or more thrust producing units.

(2) Description of Related Art

Various conventional multirotor aircrafts are known, e. g. from the documents EP2551190, EP2551193, EP2551198, EP2234883, WO2015028627, U.S. D678169, U.S. Pat. Nos. 6,568,630, 8,393,564, 7,857,253, 7,946,528, 8,733,690, US20070034738, US20130118856, DE102013108207, GB905911 and CN201306711. Other multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents CA2315524, FR2993859, US20150127209, DE102005022706 and KR101451646. However, all of these conventional multirotor aircrafts, studies and fictions are not adapted and, thus, not usable for transportation of passengers in urban areas.

Conventional multirotor structures exist in other technical domains than aircrafts. For instance, the document EP2075459 describes a multiple rotor windmill. Such multirotor structures are, however, not usable for transportation of passengers at all.

The document US2006226281 describes a ducted fan VTOL vehicle. The VTOL vehicle comprises a fuselage having four externally mounted thrusters. The four thrusters are ducted fan units. The thrusters are positioned around the outside of the fuselage and located to front, right, left, and rear sides of the fuselage. For providing such redundancy that the vehicle can hover with up to two thrusters inoperative on each side of the fuselage, the thrusters each have dual counter-rotating propellers. Also, multiple power sources located in the fuselage allow for more than one motor or engine to power each thruster. The thrusters on the front and rear can be orientated in conjunction, both to the left or to the right, to spin the VTOL vehicle on its axis. The thrusters on the left side and the right side can be orientated to face forward or backwards, creating forward or reverse movement.

The document US2014034775 describes a quad-rotor unmanned aerial vehicle (UAV). A cargo support structure of the vehicle allows multi-axis rotation of a mounted payload, e.g. sensors or weapons.

The document WO2004065208 describes a manned or unmanned VTOL vehicle having one or a plurality of ducted, magnetic induction engines mounted on a main body. An air vane assembly is capable of deflecting a part of the developed air flow in varying orientations for controlling the manoeuvring of the vehicle.

Other documents have been considered, i.e. WO2014195660, WO0064736, US2015012154 and US2015060606.

More generally, currently multiple different transportation systems and manners exist, which are all utilized and used in various ways and for various missions, e.g. air, land and water transportation. These multiple different transportation systems face an ever increasing demand of mobility of people worldwide, but are limited by existing infrastructures and possible applications. Thus, cities and, in particular, so-called mega-cities worldwide congest frequently and even daily, which can clearly be recognized from traffic jams, increased air and water pollution, etc. This, in turn, leads to the problem that transportation of individuals, e.g. by means of taxi, personal travel by car, bus, etc., is limited in operation.

In general, individuals drive less than 50 km by car, taxi and or bus in their daily business and lives. Consequently, the entire congestion and pollution of (mega-)cities or other highly dense areas result from short range transportation means, which are mainly ground based. This includes cars, buses, railway and subways. However, with an ever increasing demand of such ground based short range transportation means, the noise emission and "pollution" in the (mega-) cities increase rapidly.

In contrast to ground transportation, air transportation is a field which must typically take into account strict applicable authority regulations, certification requirements and safety demands independent of a selected air transportation vehicle, such as e. g. helicopters, airplanes, hybrid aircrafts, rockets and so on. Consequently, due to a comparatively high demand of the field of air transportation, the respective complexity of air transportation vehicles, the corresponding costs as well as the given training efforts of respective piloting humans are generally very high. Thus, air transportation is usually cost intensive, complex and commonly not affordable for individuals or small companies More specifically, air transportation means that are used for flying within urban areas underlie particularly strict applicable authority regulations, certification requirements and safety demands. As a result, the current technology selection in the field of air transportation and, more generally, in the aerospace sector for air transportation means that are used for flying within urban areas must guarantee a maximum failure probability of $10^{-9}$.

Currently, suitable technology for achieving this maximum failure probability as such generally exists in the aerospace industry. Furthermore, as described above the general idea of a multirotor structure is also a well-known concept and is available on the market in several layouts and designs. However, currently no technical solution, i.e. no aircraft with multirotor architecture, is designed, adapted and certificated for transportation of passengers within urban areas, as all known concepts, ranging from the past to current designs, do not reach the safety level necessary to transport passengers. Consequently, there is no aircraft on the market that actually transports passengers using a multirotor architecture.

BRIEF SUMMARY OF THE INVENTION

It is, therefore, an object of the present invention to provide a multirotor aircraft that is designed for transportation of passengers and that is, in particular, suitable and adapted for being certificated for operation within urban areas.

This object is solved by a multirotor aircraft as per the claims, the aircraft being adapted for various crosslink redundancies options so as to allow safe transportation of passengers.

More specifically, a multirotor aircraft as per claim 1 with at least two thrust producing units is provided. The multirotor aircraft is adapted for transportation of passengers and comprises an aircraft operating structure that is adapted for operation of the multirotor aircraft in a normal so called failure-free operating mode, and a redundant security architecture that is at least adapted for operation of the multirotor aircraft in case of a failure of the aircraft operating structure in operation. The redundant security architecture is provided to comply with applicable authority regulations and certification requirements regarding passenger transportation.

Advantageously, the inventive multirotor aircraft is designed for transportation of passengers and is, in particular, suitable and adapted for being certificated for operation within urban areas. It is easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incident, and is nevertheless adapted for fulfillment of an emergency landing, although these rotor characteristics lead to a comparatively low inertia and a non-adjustable torque in operation.

According to one aspect of the present invention, the multirotor aircraft is capable of hovering and comprises a distributed propulsion system. It is further designed with autorotation capability, which is necessary amongst other requirements in order to meet authority regulations, such as e.g. FAR and EASA regulations, regarding safety failure modes that amount up to approximately $1*10^{-7}$ failures per flight hour for the entire multirotor aircraft. In the aeronautical sector, these safety levels are typically defined by the so-called Design Assurance Levels (DAL) A to D.

Advantageously, the inventive multirotor aircraft fulfils the authorities' regulation safety level needed to transport passengers. This is preferably achieved by a combination and correlation of:
at least two individual rotor assemblies,
a redundant, segregated battery layout,
a redundant power supply and harness layout,
a physical separation and segregation of an underlying power management,
redundant, segregated electrical engines, and
pitch control and/or RPM control of the rotor assemblies.

According to a preferred embodiment, the multirotor aircraft has a fuselage that defines an internal volume adapted for transportation of passengers. The multirotor aircraft also has a plurality of thrust producing units structurally connected to the fuselage, e.g. rigidly secured.

Depending on embodiments of the invention, the multirotor aircraft comprises two thrust producing units, four thrust producing units, six thrust producing units or even height, ten or more thrust producing units, the thrust producing units being arranged in transverse pairs.

The multirotor aircraft has an aircraft operating structure that is adapted for operation of the multirotor aircraft in failure-free operating mode, and a redundant security architecture that is at least adapted for operation of the multirotor aircraft in case of a failure of the aircraft operating structure in operation.

At least one of the at least two thrust producing units comprises at least two rotor assemblies. Each one of the at least two rotor assemblies defines an associated rotor plane, wherein a first one of the at least two rotor assemblies is associated with the aircraft operating structure and a second one of the at least two rotor assemblies is associated with the redundant security architecture.

The at least two thrust producing units have at least one first engine provided for driving a first one of at least two rotor assemblies in operation, and at least one second engine being provided for driving a second one of the at least two rotor assemblies at least in operation, the at least one first engine being associated with the aircraft operating structure and the at least one second engine being associated to the redundant security architecture.

The multirotor aircraft has an energy storage system. The energy storage system comprises at least two energy providing units and at least a first one of the at least two energy providing units is connected to the at least one first engine for providing energy to the at least one first engine in operation.

At least a second one of the at least two energy providing units is connected to the at least one second engine for providing energy to the at least one second engine in operation.

For instance, the at least first one of the at least two energy providing units is associated with the aircraft operating structure and the at least second one of the at least two energy providing units is associated with the redundant security architecture.

In an embodiment, the fuselage extends along a longitudinal direction from a front to an aft of the fuselage and along a lateral direction from a left side to a right side of the fuselage.

The multirotor aircraft has at least four thrust producing units that are arranged in transverse pairs, each transverse pair being arranged along the lateral direction, respectively with one thrust producing unit of the transverse pair on the left side of the fuselage and another thrust producing unit of the transverse pair on the right side.

Therefore, at least two thrust producing units (of at least two pairs) are arranged on the right side of the fuselage and at least two other thrust producing units are arranged on the left side of the fuselage. In embodiments, at least two of the energy providing units are accommodated in the fuselage.

Otherway speaking, at least one of the energy providing units is associated to an engine in a thrust producing unit at a given (right/left) side of the fuselage. The at least one energy providing unit is also associated to another engine in another thrust producing unit at a respective opposed side (left/right) of the fuselage. The opposed side is opposed to the given side relatively to the longitudinal direction of the fuselage.

In an embodiment where at least one of the energy providing units is associated to at least one thrust producing unit at a left side of the fuselage in a forward transverse pair of thrust producing units relatively to at least one of a respectively rearward transverse pair of thrust producing units. Also, the energy providing unit is associated to at least another thrust producing unit at a right side of the fuselage in the rearward transverse pair of thrust producing units.

At least another of the energy providing units is associated to at least a further thrust producing unit at a right side of the fuselage in the forward transverse pair of thrust producing units relatively to the rearward transverse pair of thrust producing units, the other energy providing unit being also associated to the thrust producing unit at a left side of the fuselage in the rearward transverse pair of thrust producing units.

Therefore, the thrust producing units are respectively associated in a manner to be opposed one another relatively to the longitudinal direction and to the lateral direction of the fuselage.

In an embodiment, at least one of the energy providing units is associated to a first engine in a thrust producing unit at a given side of the fuselage, the later energy providing unit also being associated to the second engine at the respective opposed side of the fuselage.

In an embodiment, the multirotor aircraft comprises an odd number of transverse pairs along the longitudinal direction of the fuselage.

At least one intermediate transverse pair of thrust producing units is arranged between two other transverse pairs of thrust producing units. The two other transverse pairs are respectively longitudinally shifted along the longitudinal direction relatively the intermediate transverse pair. The multirotor aircraft also comprising at least a given energy providing unit, and another energy providing unit.

The given energy providing unit is associated to the first engine at one given side of the intermediate transverse pair and the other energy providing unit is associated to the first engine of the intermediate transverse pair at an opposed side to the given side, relatively the longitudinal direction.

Also, the other energy providing unit is associated to the second engine at the given side of the intermediate transverse pair and at the given energy providing unit is associated to the second engine of the intermediate transverse pair on the opposed side to the given side.

According to a further preferred embodiment, the first one of the at least two rotor assemblies comprises at least two rotor blades and the second one of the at least two rotor assemblies comprises at least two rotor blades.

According to one aspect of the present invention, at least one of the thrust producing units can be provided with a foreign object protection, e. g. by being enclosed by a grid, in order to protect the rotor assemblies from foreign objects. Such a foreign object protection advantageously prevents misuse and accidents by and of individuals, e. g. by preventing them from getting their hands caught in rotating parts, thereby leading to an increased operational safety level. Furthermore, at least one of the thrust producing units can be inclined.

According to a further preferred embodiment, the first one of the at least two rotor assemblies defines a first rotor axis and the second one of the at least two rotor assemblies defines a second rotor axis. The first and second rotor axes are spaced apart from each other.

According to a further preferred embodiment, the first one of the at least two rotor assemblies defines a first rotor axis and the second one of the at least two rotor assemblies defines a second rotor axis. The first and second rotor axes are coaxially arranged.

According to a further preferred embodiment, the first and second rotor axes are inclined by associated inclination angles comprised in a range between −60° and +60°, wherein the associated inclination angles preferably amount to 0°.

According to a further preferred embodiment, the at least one of the at least two thrust producing units is inclined in longitudinal direction of the multirotor aircraft by an associated longitudinal inclination angle defined between a vertical reference line of the multirotor aircraft and the first and second rotor axes. The associated longitudinal inclination angle is comprised in a range between −45° and +80° and preferably amounts to 7°.

According to a further preferred embodiment, at least one other thrust producing unit is provided that is inclined in longitudinal direction of the multirotor aircraft by another longitudinal inclination angle defined between the vertical reference line and first and second rotor axes of the at least one other thrust producing unit. The other longitudinal inclination angle is comprised in a range between −45° and +80° and preferably amounts to 7°.

According to a further preferred embodiment, the at least one of the at least two thrust producing units is inclined in lateral direction of the multirotor aircraft by an associated lateral inclination angle defined between a vertical reference line of the multirotor aircraft and the first and second rotor axes. The associated lateral inclination angle is comprised in a range between −45° and +80° and preferably amounts to 5°.

According to a further preferred embodiment, at least one other thrust producing unit is provided that is inclined in lateral direction of the multirotor aircraft by another lateral inclination angle defined between the vertical reference line and first and second rotor axes of the at least one other thrust producing unit. The other lateral inclination angle is comprised in a range between −45° and +80° and preferably amounts to 5°.

According to a further preferred embodiment, the first one of the at least two rotor assemblies is adapted to be rotated in a first rotation direction in operation and the second one of the at least two rotor assemblies is adapted to be rotated in a second rotation direction in operation. The first rotation direction is opposed to the second rotation direction.

In an embodiment, the energy storage system comprises energy distribution devices that are operatively connected between the energy providing units and the thrust producing units. The multirotor aircraft has a number of energy distribution devices that is at least as much than the thrust producing units. Each of the energy distribution devices is operatively connected to a sole respective energy providing unit by a single associated energy storage transmission arrangement and the energy distribution devices are interconnected with each other by an associated distribution transmission arrangement.

In an embodiment, the at least one first and second engines define a single segregated electrical engine that comprises at least two separate electric coils, the at least two separate electric coils being adapted to provide electrical power independent from each other in operation. At least one first electric coil is associated with the aircraft operating structure and at least one second electric coil is associated with the redundant security architecture.

In an embodiment, the energy storage system comprises at least as much energy providing units than the multirotor aircraft has thrust producing units, wherein at least a first one of the at least two energy providing units is connected to the at least one first engine for providing energy to the at least one first engine in operation and at least a second one of the at least two energy providing units is connected to the at least one second engine for providing energy to the at least one second engine in operation. The at least first one of the energy providing units is associated with the aircraft operating structure and the second one of the at least two energy providing units is associated with the redundant security architecture.

In an embodiment, the energy storage system comprises a battery system, and the at least two energy providing units are defined by associated battery units.

In an embodiment, the fuselage is extended along a longitudinal length in the longitudinal direction, along a transverse length in the lateral direction and along an elevation length in an elevation direction of the multirotor aircraft. The multirotor aircraft has a center of gravity that forms the barycentre of a crossing propulsion volume.

The crossing propulsion volume is in turn extended over a longitudinal dimension extending on 0.01 to 0.9 times the longitudinal length of the fuselage along the longitudinal direction, over a transverse dimension extending on 0.01 to 0.9 times the transverse length of the fuselage along the lateral direction and over an elevation dimension extending on −2 to +2 times the elevation length along the elevation direction. The crossing propulsion volume thus encompasses the center of gravity. The dimensions of the crossing propulsion volume are therefore ranges values of corresponding fuselage lengths, in a given direction.

The at least two thrust producing units are arranged in a layout with one of the at least two thrust producing units relatively another, in crossed sideward, length ward locations at crosslink opposed positions on a respective crossing propulsion axis, all the crossing propulsion axis meeting together inside the crossing propulsion volume, e.g. near the center of gravity.

In an embodiment, the at least one first engine in one of the at least two thrust producing units on a given side (left/right) of the fuselage is arranged in a redundant and segregated layout relatively with the second engine of the other of the at least two thrust producing units on the other side (right/left) opposed to the given side. The at least one first engine and second engine is arranged in crossed upward/downward locations at crosslink opposed positions on the respective crossing propulsion axis and each of the at least one first engine and second engine is arranged outside the crossing propulsion volume.

Advantageously, by providing at least two rotor assemblies that define different rotor planes as described above, the rotor assemblies can be positioned above each other and rotated in a counter rotating manner, leading to thrust producing units that provide for an increased safety level and that allow reduction of the overall dimensions of the inventive multirotor aircraft, resulting in a comparatively small aircraft, since two or more rotor planes can be combined in a single thrust producing unit. Furthermore, each thrust producing unit is adapted for providing torque individually as a result of its counter rotating rotor assemblies, which can be used to maneuver the multirotor aircraft, e. g. with respect to yawing.

According to a further preferred embodiment, at least one first engine is provided for driving the first one of the at least two rotor assemblies in operation and at least one second engine is provided for driving the second one of the at least two rotor assemblies in operation. The at least one first engine is associated with the aircraft operating structure and the at least one second engine is associated with the redundant security architecture.

By providing multiple separate rotor assemblies and associated engines within multiple separated thrust producing units, higher quantities must be provided, thus, reducing a respective unit pricing. Furthermore, the mechanical complexity of the inventive multirotor aircraft can be reduced to a minimum resulting in reduced costs and increased reliability, particularly if each rotor assembly is implemented by means of a fixed pitch propeller assembly that is RPM controlled. Moreover, use of overall common standard parts, such as e. g. bearings, fittings and shafts, leads to higher quantities, thus, again reducing a respective unit pricing.

According to a further preferred embodiment, the at least one first and second engines define a single segregated electrical engine that comprises at least two separate electric coils. The at least two separate electric coils are adapted to provide electrical power independent from each other in operation. At least one first electric coil is associated with the aircraft operating structure and at least one second electric coil is associated with the redundant security architecture.

According to a further preferred embodiment, an energy storage system is provided. The energy storage system comprises at least two energy providing units, wherein at least a first one of the at least two energy providing units is connected to the at least one first engine for providing energy to the at least one first engine in operation and at least a second one of the at least two energy providing units is connected to the at least one second engine for providing energy to the at least one second engine in operation. The at least first one of the at least two energy providing units is associated with the aircraft operating structure and the at least second one of the at least two energy providing units is associated with the redundant security architecture.

According to a further preferred embodiment, the at least one first engine and second engine of the thrust producing unit on a given left/right side is arranged in a redundant and segregated layout relatively with the other thrust producing unit, in crossed upward/downward locations at crosslink opposed positions on the respective crossing propulsion axis, where each of the at least one first engine and second engine is arranged outside the crossing propulsion volume.

In an embodiment, the energy storage system comprises a battery system, wherein the at least two energy providing units are defined by associated battery units.

In an embodiment, the at least two thrust producing units have each an gearbox fairing, and the first and second engines of each of the thrust producing units are arranged inside of the gearbox fairing so as to be encompassed by the gearbox fairing.

According to a further preferred embodiment, an energy storage system is provided, the energy storage system comprising at least two energy providing units. At least a first one of the at least two energy providing units is associated with the aircraft operating structure and at least a second one of the at least two energy providing units is associated with the redundant security architecture.

According to a further preferred embodiment, the at least one of the at least two thrust producing units comprises an associated shrouding, the at least two rotor assemblies being accommodated in the associated shrouding.

Advantageously, the shrouding of the thrust producing units allows reducing the overall dimensions of the inventive multirotor aircraft. Furthermore, individuals approaching the shrouded thrust producing units are protected against injury, foreign object damages of the thrust producing units in operation, such as e. g. bird strike or wire strike, can securely and reliably be prevented, and the overall operational safety of the multirotor aircraft in the case of air collisions can be improved. Moreover, the multirotor aerodynamics can be improved by means of the shrouding and an underlying required diameter of the thrust producing units can be reduced. Additionally, lift of the multirotor aircraft can be improved by the shrouding itself, potentially reducing the overall power required by the aircraft.

It should be noted that although the inventive aircraft is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units according to the present invention. Consequently, any reference to rotors or rotor structures in the present description should likewise be understood as a reference to propellers and propeller structures, so that the inventive multirotor aircraft can likewise be implemented as a multipropeller and/or multipropeller and -rotor aircraft.

In other words, the present invention principally relates to a multiple thrust configuration with rotors/propellers that define rotor/propeller planes, which can be selected to be positioned atop of each other individually, an optional rotor shrouding for enclosing any rotating parts, at least one electrical engine which drives each rotor/propeller, wherein each engine can be segregated in order to increase a provided safety level, and wherein a logic connection exists between battery and electrical engines, the logic connection comprising a redundant design increasing the safety level in case of failure, and wherein a battery redundancy layout with an appropriate safety level in case of failure is provided.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
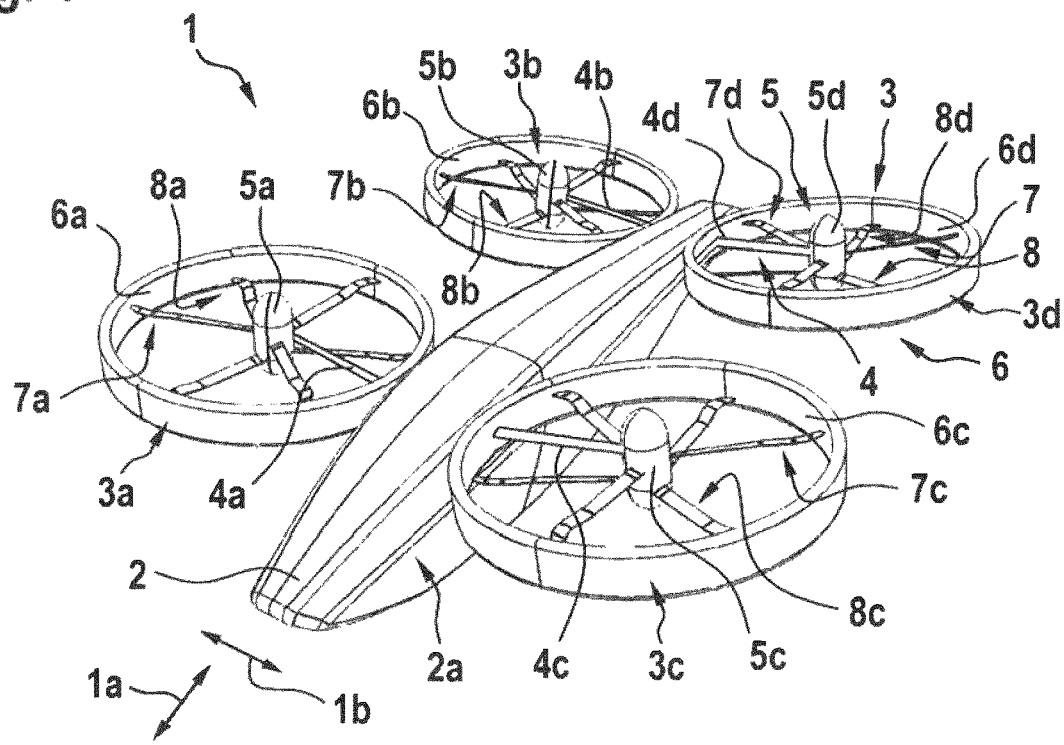
FIG. 1 shows a perspective view of a multirotor aircraft with a plurality of thrust producing units according to an embodiment of the present invention.

FIG. 1 shows a multirotor aircraft 1 with an aircraft airframe 2 according to the present invention. The aircraft airframe 2 defines a supporting structure that is also referred to hereinafter as the fuselage of the multirotor aircraft 1.

The fuselage 2 has a longitudinal length in longitudinal direction 1a and a transverse length in lateral direction 1b. The fore (illustrated at the left of FIG. 2)/aft (illustrated at the right of FIG. 2) locations of structures in the multirotor aircraft 1 are defined along the longitudinal direction 1a regarding a lateral plane.

Figure 13:
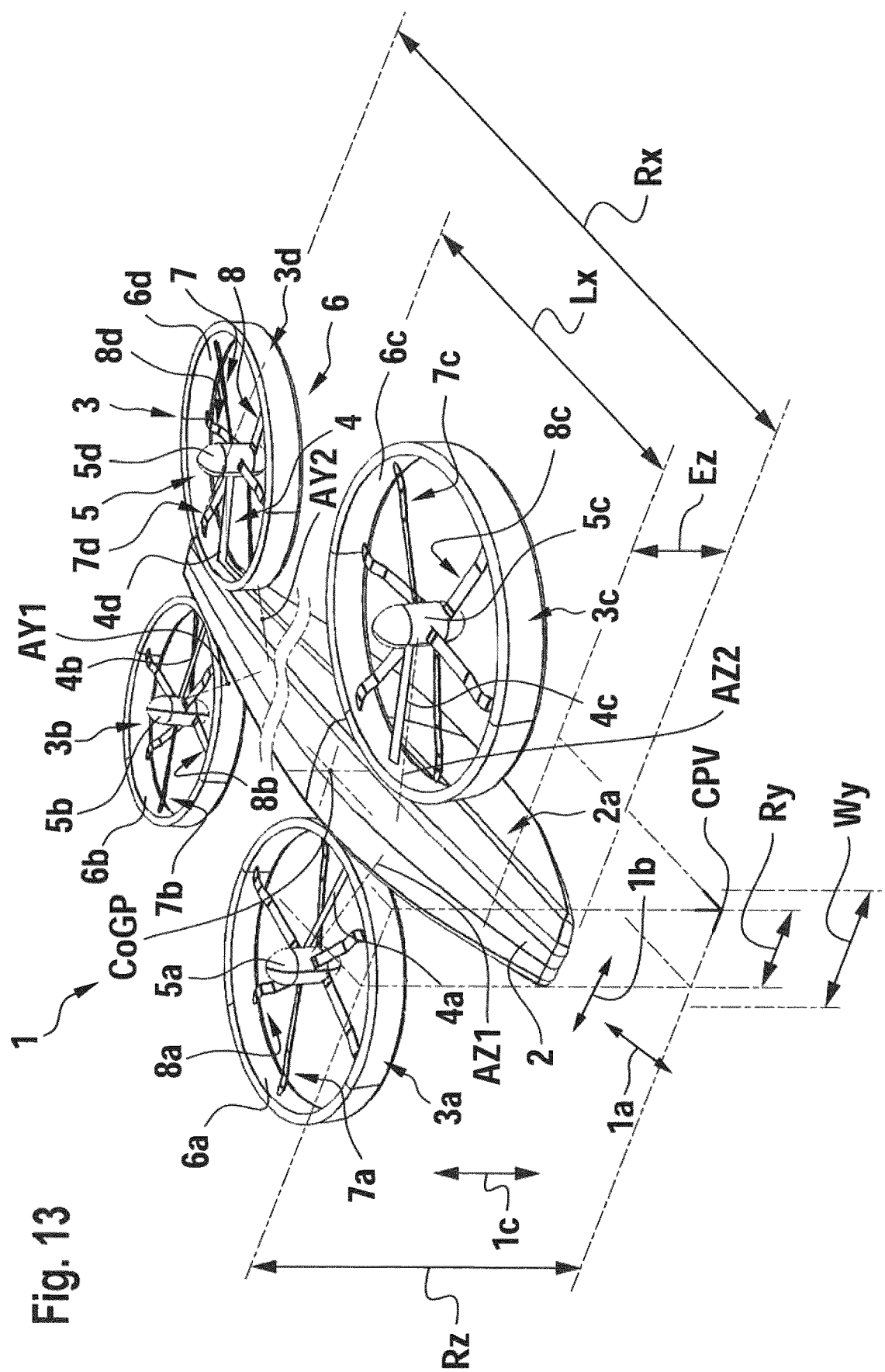
FIG. 13 shows a perspective side view of a multirotor aircraft and of the Center of Gravity location around which is extended/inscribed a Crossing Propulsion Volume.

The fuselage 2 also has an elevation length in elevation direction 1c (shown on FIG. 13). The upper/lower locations of structures in the multirotor aircraft 1 are defined along the elevation direction 1c regarding a longitudinal and transverse plane.

The fuselage 2 preferably defines an internal volume 2a that is at least adapted for transportation of passengers, so that the multirotor aircraft 1 as a whole is adapted for transportation of passengers. The internal volume 2a is preferably further adapted for accommodating operational and electrical equipment, such as e. g. an energy storage system (24 in FIG. 7) that is required for operation of the multirotor aircraft 1.

It should be noted that exemplary configurations of the internal volume 2a that are suitable for transportation of passengers, but also for accommodation of operational and electrical equipment, are readily available to the person skilled in the art and generally implemented to comply with applicable authority regulations and certification requirements regarding passenger transportation. Thus, as these configurations of the internal volume 2a as such are not part of the present invention, they are not described in detail for brevity and conciseness.

Figure 2:
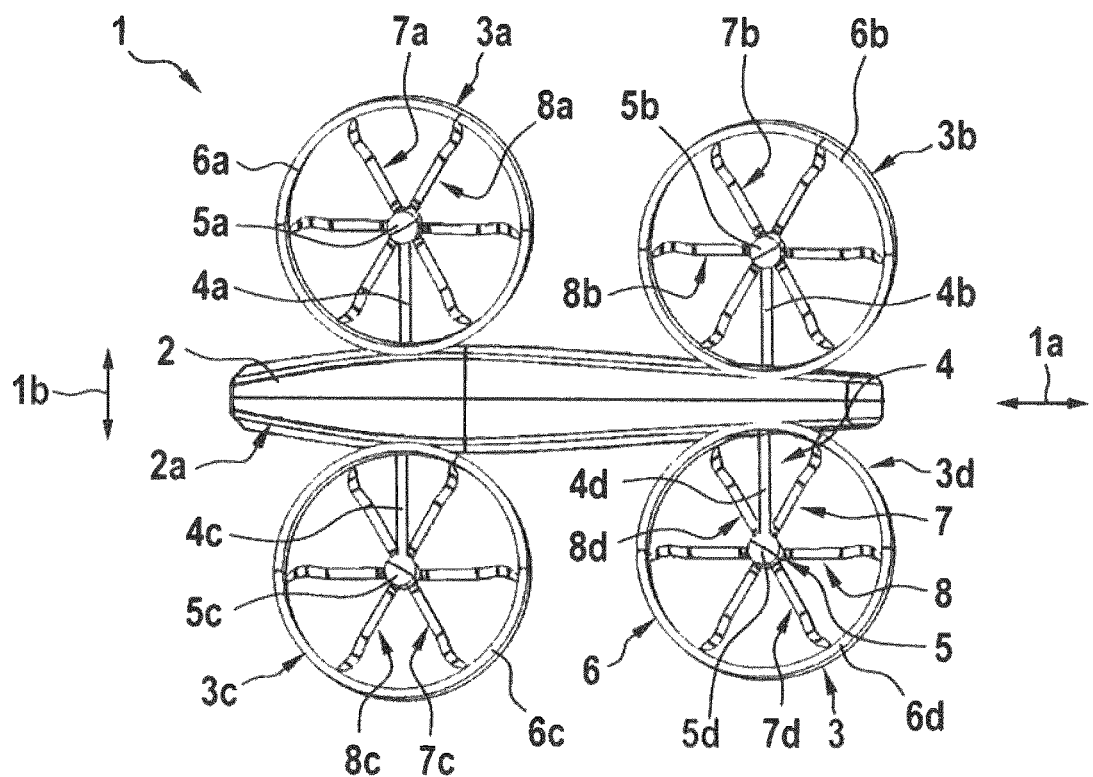
FIG. 2 shows a top view of the multirotor aircraft of FIG. 1.

In some embodiments, the invention provides for at least two thrust producing units, e.g. 3a, 3b on the right side of the multirotor aircraft 1, and 3c, 3d on the left side of the multirotor aircraft 1 of FIG. 2. In some embodiments, the thrust producing units are also arranged, i.e. located, in transverse pairs i.e. in a side-by-side configuration along the lateral direction 1b.

For instance FIG. 2 shows one fore (front) transverse pair 3a-3c of thrust producing units, and another aft/rear transverse pair 3b-3d of thrust producing units. Each transverse pair 3a-3c, 3b-3d is arranged along the lateral direction 1b respectively with one thrust producing unit (3a, 3b) of the transverse pairs on the left side of the fuselage 2 and another thrust producing unit (3c, 3d) of the transverse pairs on the right side.

On FIG. 1, the multirotor aircraft 1 includes two transverse pairs of thrust producing units, i.e. a fore transverse pair formed by the thrust producing unit 3a on the right side and the thrust producing unit 3c on the left side, and an aft transverse pair (3b-3d) formed by the thrust producing units 3b respectively on the right side and the thrust producing unit 3d on the left side.

Some embodiments do not comprise such transverse pairs. For instance, thrust producing units in the multirotor aircraft 1 do not belong to any transverse pair e.g. an isolated thrust producing unit is located at the fore end and/or aft end of the fuselage 2.

If any, having at least two transverse pairs of thrust producing units allows the invention providing left/right crossed redundant design increasing the safety multiple aircraft 1 in case of failure, as exposed with more details further on.

Figure 12:
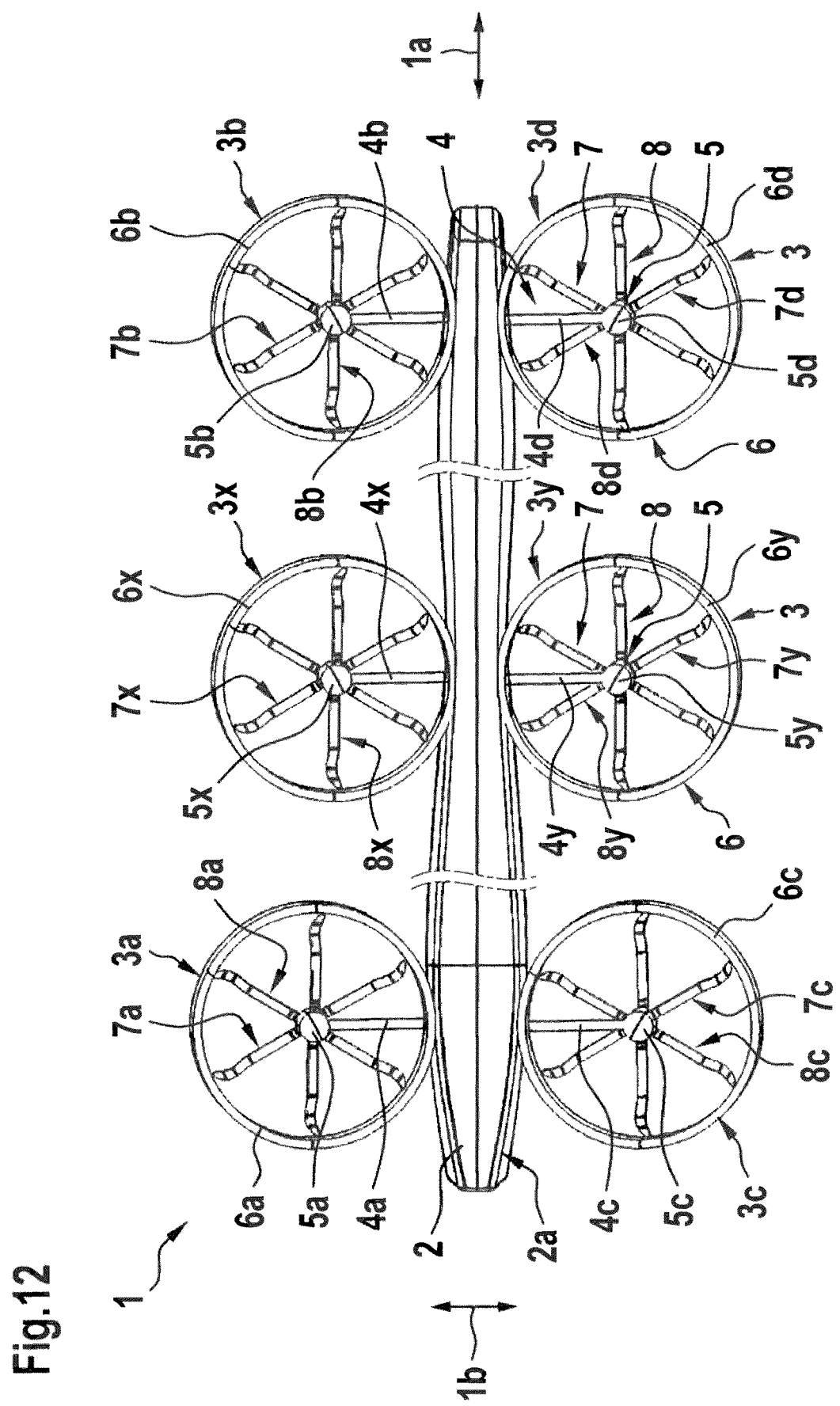
FIG. 12 shows a top view of a multirotor aircraft similar to the one of FIG. 1, but having more than four thrust producing units.

Some embodiments of the invention provide for at least two thrust producing units, such as e.g. units 3a, 3x, 3b on the right side, and units 3c, 3y, 3d on the left side of the multirotor aircraft 1 of FIG. 12. These units 3a, 3x, 3b and 3c, 3y, 3d are arranged, i.e. located, in lengthwise rows i.e. in a generally in straight line one-behind the other configuration along the longitudinal direction 1a on a given side of the fuselage 2.

Figure 15:
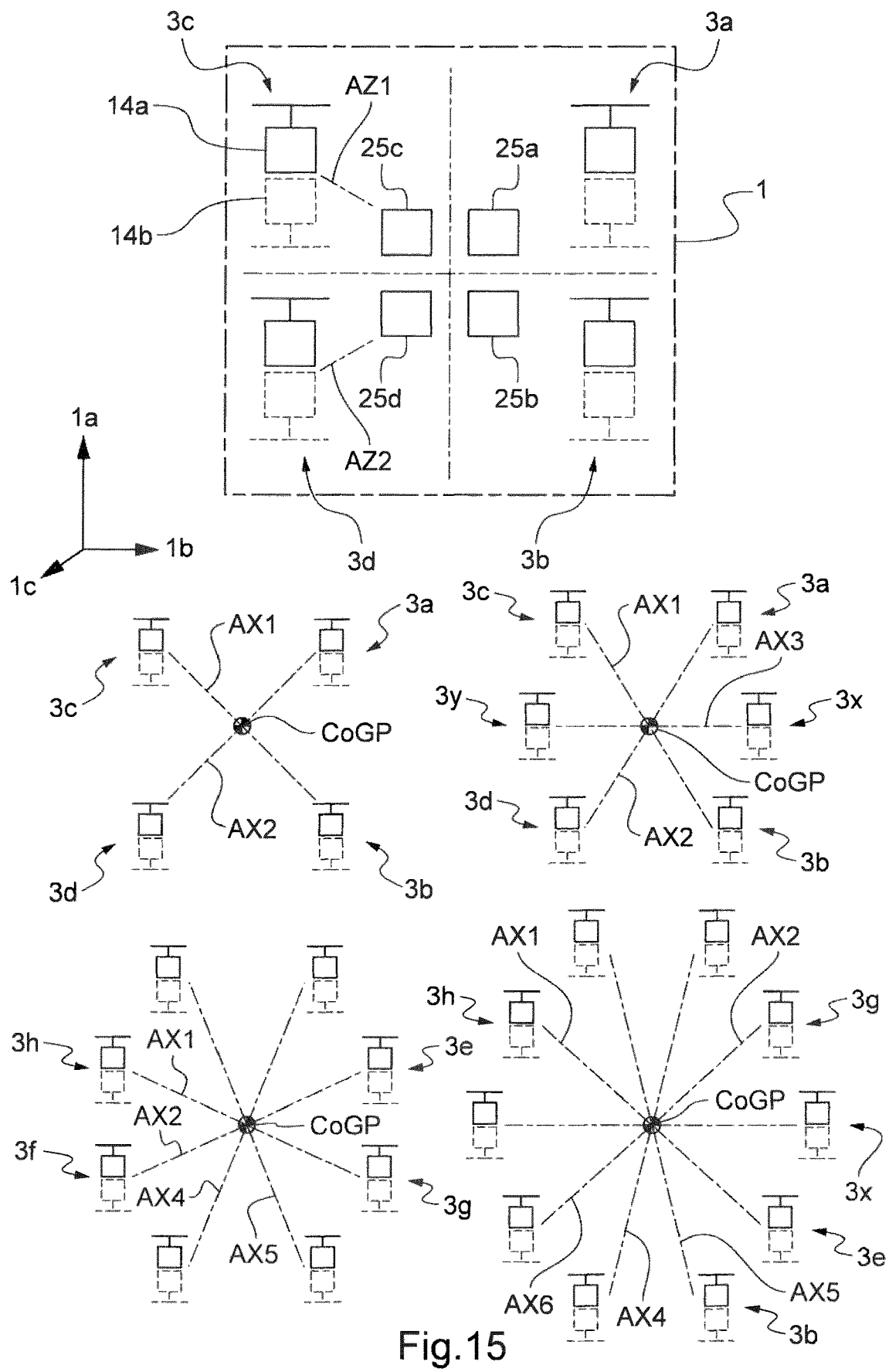
FIG. 15 shows embodiments of multirotor aircraft having respectively two, three four and five pairs of thrust producing units, outwardly extending from lateral sides of a fuselage, and each corresponding to a redundancy crossed scheme.

Distinctively, in the bottom embodiments of FIG. 15 units 3a, 3g, 3x, 3e, 3b on the left side and units 3c, 3h, 3y, 3f, 3d on the right side, are not in straight line, but disposed along a outwardly bending curve, whose climax is between the foremost thrust unit (3a, 3c) and the rearmost unit (3b, 3d), for instance close to the location along the longitudinal direction 1a, of a center of gravity CoGP of the aircraft 1.

The multirotor aircraft 1 of FIG. 1 includes two lengthwise rows of thrust producing units, i.e. a right side lengthwise row formed by the thrust producing unit 3a on the front right of the fuselage 2 and the thrust producing unit 3b on the rear right of the fuselage 2. A left side lengthwise row is formed by the thrust producing unit 3c on the front left of the fuselage and the thrust producing unit 3d on the rear left of the fuselage 2.

Having such lengthwise rows of thrust producing units allows the invention providing fore/aft crossed redundant design increasing the safety of the multiple aircraft 1 in case of failure, as exposed with more details further on.

Also, in some embodiments the linear or non-linear side arrangements of two, three, four, five or more thrust producing units are distributed regularly along the fuselage 2, i.e. at substantially equal longitudinal intervals. In other embodiments the linear or non-linear side arrangements of thrust producing units are distributed irregularly along the fuselage 2, i.e. at substantially uneven longitudinal intervals.

As per FIG. 2 or 12, embodiments of the invention provides that two or more thrust producing units (e.g. 3a, 3x, 3b) are arranged laterally on the right side and more than two other thrust producing units (e.g. 3c, 3y, 3d) are located on the laterally opposed left side of the fuselage 2. In such embodiments, two or more two thrust producing units are on each side of the fuselage 2, disposed sensibly along the longitudinal direction 1a.

Embodiments of FIG. 15 provide linear and non-linear side arrangements of two, three, four, five thrust producing units 3a, 3g, 3x, 3e, 3b and 3c, 3h, 3y, 3f, 3d. Other embodiments comprise more than ten thrust producing units.

According to one aspect of the present invention, the multirotor aircraft 1 is a rotorcraft and comprises a plurality of thrust producing units 3. Preferably, the plurality of thrust producing units 3 comprises at least two and preferentially four thrust producing units 3a, 3b, 3c, 3d. The thrust producing units 3a, 3b, 3c, 3d are embodied for producing thrust (9 in FIG. 3) in operation, such that the multirotor aircraft 1 is able to hover in the air as well as to fly in any forward or rearward direction.

The thrust producing units 3a, 3b, 3c, 3d are structurally connected to the fuselage 2. By way of example, this is achieved by means of a plurality of structural supports 4. More specifically, the thrust producing unit 3a is preferably connected to the fuselage 2 via a structural support 4a, the thrust producing unit 3b via a structural support 4b, the thrust producing unit 3c via a structural support 4c and the thrust producing unit 3d via a structural support 4d, wherein the structural supports 4a, 4b, 4c, 4d define the plurality of structural supports 4.

Preferably, at least one of the thrust producing units 3a, 3b, 3c, 3d comprises an associated shrouding in order to improve underlying aerodynamics and to increase operational safety. By way of example, a plurality of shrouding units 6 is shown with four separate shroudings 6a, 6b, 6c, 6d. Illustratively, the shrouding 6a is associated with the thrust producing unit 3a, the shrouding 6b with the thrust producing unit 3b, the shrouding 6c with the thrust producing unit 3c and the shrouding 6d with the thrust producing unit 3d.

The term "associated" means that when a first structural element is associated to a second one, the associated structural element i.e. the first one is a part of the second structural element.

The shroudings 6a, 6x, 6b, 6c, 6y, 6d can be made of a simple sheet metal. Alternatively, they may have a complex geometry, such as e.g. described below with reference to FIG. 5 or 12.

Furthermore, the shroudings 6a, 6x, 6b, 6c, 6y, 6d can be connected to the fuselage 2 together with the structural supports 4a, 4b, 4c, 4d, in order to reinforce the connection between the thrust producing units 3a, 3b, 3c, 3d and the fuselage 2. Alternatively, only the shroudings 6a, 6x, 6b, 6c, 6y, 6d can be connected to the fuselage 2.

However, it should be noted that the shroudings 6a, 6b, 6c, 6d are merely optional and not necessarily required for operational reasons. Thus, the shroudings 6a, 6b, 6c, 6d can be omitted and the thrust producing units 3a, 3b, 3c, 3d are only connected to the fuselage 2 by means of the structural supports 4a, 4b, 4c, 4d, as described above. Alternatively, the thrust producing units 3a, 3b, 3c, 3d can be interconnected by any suitable interconnection means, such as an interconnection frame, wherein the interconnection means is connected to the fuselage 2.

According to one aspect of the present invention, at least one and, preferably, each one of the thrust producing units 3a, 3b, 3c, 3d is equipped with at least two rotor assemblies. By way of example, the thrust producing unit 3a is equipped with two rotor assemblies 7a, 8a, the thrust producing unit 3b is equipped with two rotor assemblies 7b, 8b, the thrust producing unit 3c is equipped with two rotor assemblies 7c, 8c and the thrust producing unit 3d is equipped with two rotor assemblies 7d, 8d. The rotor assemblies 7a, 7b, 7c, 7d illustratively define a plurality of upper rotor assemblies 7 and the rotor assemblies 8a, 8b, 8c, 8d illustratively define a plurality of lower rotor assemblies 8.

The plurality of upper and lower rotor assemblies 7, 8 is preferably connected to the plurality of structural supports 4 by means of a plurality of gearbox fairings 5. Illustratively, the upper and lower rotor assemblies 7a, 8a are connected to the structural support 4a by means of a gearbox fairing 5a, the upper and lower rotor assemblies 7b, 8b are connected to the structural support 4b by means of a gearbox fairing 5b, the upper and lower rotor assemblies 7c, 8c are connected to the structural support 4c by means of a gearbox fairing 5c and the upper and lower rotor assemblies 7d, 8d are connected to the structural support 4d by means of a gearbox fairing 5d. The FIG. 12 also shows gearbox fairings 5x and 5y.

Figure 6:
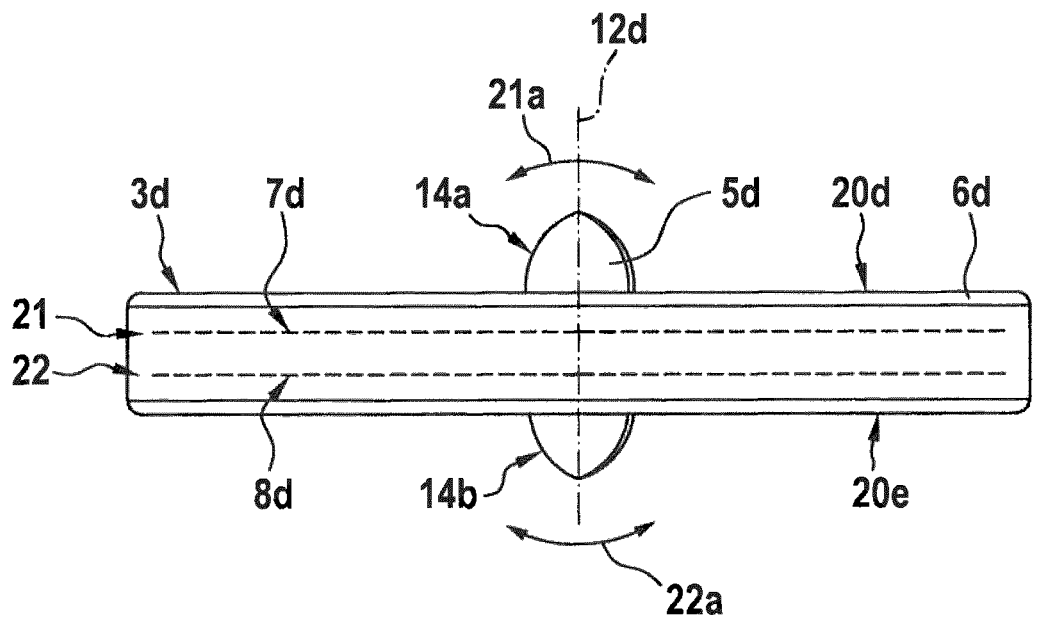
FIG. 6 shows a partly transparent side view of the thrust producing unit of FIG. 5.

Preferably, each one of the upper rotor assemblies 7a, 7b, 7c, 7d defines an associated upper rotor plane (21 in FIG. 6) and each one of the lower rotor assemblies 8a, 8b, 8c, 8d defines an associated lower rotor plane (22 in FIG. 6). Preferably, the upper and lower rotor assemblies 7a, 7b, 7c, 7d, 8a, 8b, 8c, 8d define pairs of upper and lower rotor assemblies 7a, 8a; 7b, 8b; 7c, 8c; 7d, 8d that are accommodated in the optional shroudings 6a, 6b, 6c, 6d, respectively, so that the associated upper and lower rotor planes (21, 22 in FIG. 6) are located inside the optional shroudings 6a, 6b, 6c, 6d of the multirotor aircraft 1.

According to one aspect of the present invention, the multirotor aircraft 1 comprises an aircraft operating structure and a redundant security architecture. The aircraft operating structure is preferably adapted for operation of the multirotor aircraft 1 in failure-free operating mode and the redundant security architecture is preferably at least adapted for operation of the multirotor aircraft 1 in case of a failure of the aircraft operating structure. In particular, the redundant security architecture is provided to comply preferentially with applicable authority regulations and certification requirements regarding passenger transportation.

Preferably, the aircraft operating structure comprises at least a first part of the upper and lower rotor assemblies 7a, 7b, 7c, 7d, 8a, 8b, 8c, 8d and the redundant security architecture comprises at least a second part of the upper and lower rotor assemblies 7a, 7b, 7c, 7d, 8a, 8b, 8c, 8d. Preferentially, a first one of the upper and lower rotor assemblies 7a, 8a, 7b, 8b, 7c, 8c, 7d, 8d of each thrust producing unit 3a, 3b, 3c, 3d is associated with the aircraft operating structure, while a second one is associated with the redundant security architecture. By way of example, the upper rotor assemblies 7a, 7b, 7c, 7d are associated with the aircraft operating structure and the lower rotor assemblies 8a, 8b, 8c, 8d are associated with the redundant security architecture. Thus, at least in case of a failure of the upper rotor assemblies 7a, 7b, 7c, 7d, the lower rotor assemblies 8a, 8b, 8c, 8d operate the multirotor aircraft 1 in order to avoid e. g. a crash thereof.

As per embodiments of the invention, at least a second energy providing unit (e.g. 25a, 25b, 25c, 25d) is associated with at least one thrust unit of the redundant security architecture. At least another thrust unit associated with the aircraft operating structure is arranged laterally on the right side of the multirotor aircraft 1 and associated to a first energy providing unit.

For so-called segregated embodiments of the invention, at least as much energy providing units (25a, 25b, 25c, 25d or more) are provided, than the corresponding multirotor aircraft 1 has distinct thrust producing units (e.g. 3a, 3g, 3x, 3e, 3b, 3c, 3h, 3y, 3f, 3d). Typically, the invention provides four, six, height, ten or more energy providing units. With the invention, some energy providing units are onboard the fuselage 2 and/or some energy providing units are outboard the fuselage, e.g. in the associated thrust units e.g. 3a, 3g, 3x, 3e, 3b, 3c, 3h, 3y, 3f, 3d.

It should, however, be noted that the above configuration or the one of FIG. 12, wherein the upper rotor assemblies e.g. 7a, 7x, 7b, 7c, 7y, 7d are associated with the aircraft operating structure and the lower rotor assemblies 8a, 8x, 8b, 8c, 8y, 8d are associated with the redundant security architecture, is merely described by way of example and not for limiting the invention thereto. Instead, alternative associations are likewise possible and contemplated. For instance, the rotor assemblies 7a, 7c, 8b, 8d can be associated with the aircraft operating structure, while the rotor assemblies 8a, 8c, 7b, 7d are associated with the redundant security architecture, and so on. As such alternative associations are readily available to the person skilled in the art, they are likewise contemplated and considered as being part of the present invention.

FIG. 2 or 12 shows the multirotor aircraft 1 of FIG. 1 with the thrust producing units (respectively 3a, 3b, 3c, 3d or 3a, 3x, 3b, 3c, 3y, 3d) that are connected to the fuselage 2. The FIG. 2 shows thrust producing units 3a, 3b, 3c, 3d that are respectively comprise the upper and lower rotor assemblies 7a, 7b; 7b, 8b; 7c, 8c; 7d, 8d, which are preferably arranged in a side-by-side configuration with congruent rotor axes (12 in FIG. 3 and FIG. 4). However, alternative configurations are likewise contemplated, such as e. g. described below with reference to FIG. 10 or 12.

As can further be seen from FIG. 2, the thrust producing units 3a, 3b, 3c, 3d are all exemplarily arranged laterally with respect to the fuselage 2, i.e. on the left or right side of the fuselage 2 seen in its longitudinal direction 1a. Illustratively, the left side corresponds to the lower side and the right side to the upper side of the fuselage 2 as shown in FIG. 2. Furthermore, the fuselage 2 is exemplarily embodied such that the laterally arranged thrust producing units 3a, 3b, 3c, 3d define at least approximately a trapezoidal shape.

However, it should be noted that this exemplary arrangement is only described by way of example and not for limiting the present invention thereto. Instead, other arrangements are also possible and likewise contemplated. For instance, two of the thrust producing units 3a, 3b, 3c, 3d can respectively be arranged at a front and rear section of the fuselage 2, and so on.

Figure 3:
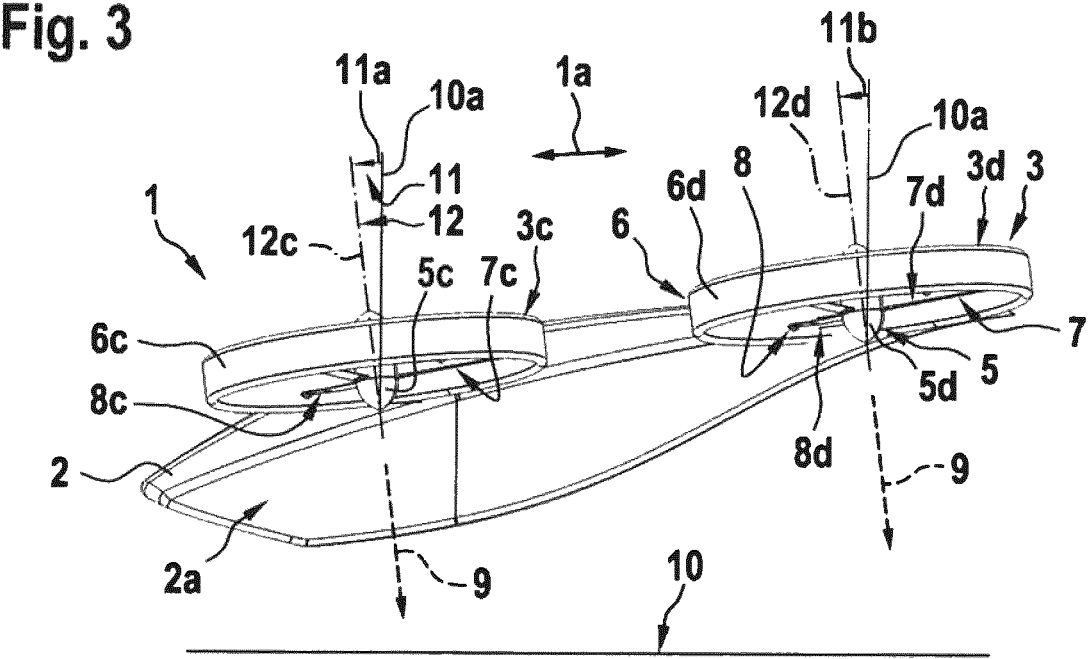
FIG. 3 shows a side view of the multirotor aircraft of FIG. 1 and FIG. 2 in normal flight mode.

FIG. 3 shows the multirotor aircraft 1 of FIG. 1 and FIG. 2 in an exemplary failure-free operating mode. In this exemplary failure-free operating mode, the plurality of thrust producing units 3 produce thrust 9 by means of the plurality of upper and/or lower rotor assemblies 7, 8 that is suitable to lift the multirotor aircraft 1 off ground 10.

Each one of the plurality of upper rotor assemblies 7 defines a first rotor axis and each one of the plurality of lower rotor assemblies 8 defines a second rotor axis. Preferably, the first and second rotor axes are respectively congruent, i.e. coaxially arranged. Thus, the plurality of upper and lower rotor assemblies 7, define a plurality of coaxially arranged rotor axes 12. Illustratively, the upper and lower rotor assemblies 7c, 8c define first and second congruent rotor axes, which are commonly referred to as the rotor axis 12c, and the upper and lower rotor assemblies 7d, 8d define first and second congruent rotor axes, which are commonly referred to as the rotor axis 12d.

Preferably, the plurality of thrust producing units 3 is inclined in the longitudinal direction 1a of the multirotor aircraft 1 by a plurality of longitudinal inclination angles 11 in order to increase the maneuverability of the multirotor aircraft 1 and to reduce an overall inclination in the longitudinal direction 1a of the multirotor aircraft 1 during forward flight. The plurality of longitudinal inclination angles 11 is illustratively defined between a vertical reference line 10a of the multirotor aircraft 1 and the plurality of coaxially arranged rotor axes 12. Preferably, a possible and realized number of the plurality of longitudinal inclination angles 11 depends on an underlying number of provided thrust producing units.

More specifically, according to one aspect of the present invention, at least one of the plurality of thrust producing units 3 is inclined in the longitudinal direction 1a of the multirotor aircraft 1 by a first longitudinal inclination angle defined between a vertical reference line 10a of the multirotor aircraft 1 and the first and second congruent rotor axes of this at least one of the plurality of thrust producing units 3. The first longitudinal inclination angle is preferably comprised in a range between −45° and +80°, and preferentially amounts to 7°.

Illustratively, the thrust producing unit 3c of the plurality of thrust producing units 3 is inclined by a first longitudinal inclination angle 11a defined between the vertical reference line 10a and the rotor axis 12c, wherein the first longitudinal inclination angle 11a is preferably comprised in a range between −45° and +80°, and preferentially amounts to 7°. However, it should be noted that the thrust producing unit 3a of the plurality of thrust producing units 3 of FIG. 1 and FIG. 2 is preferably also inclined by the first longitudinal inclination angle 11a.

According to one aspect of the present invention, at least one of the plurality of thrust producing units 3 is inclined in the longitudinal direction 1a of the multirotor aircraft 1 by a second longitudinal inclination angle defined between the vertical reference line 10a and the first and second congruent rotor axes of this at least one of the plurality of thrust producing units 3. The second longitudinal inclination angle is preferably also comprised in a range between −45° and +80°, and preferentially amounts to 7°.

Illustratively, the thrust producing unit 3d of the plurality of thrust producing units 3 is inclined by a second longitudinal inclination angle 11b defined between the vertical reference line 10a and the rotor axis 12d, wherein the second longitudinal inclination angle 11b is preferably comprised in a range between −45° and +80°, and preferentially amounts to 7°. However, it should be noted that the thrust producing unit 3b of the plurality of thrust producing units 3 of FIG. 1 and FIG. 2 is preferably also inclined by the second longitudinal inclination angle 11b.

Figure 4:
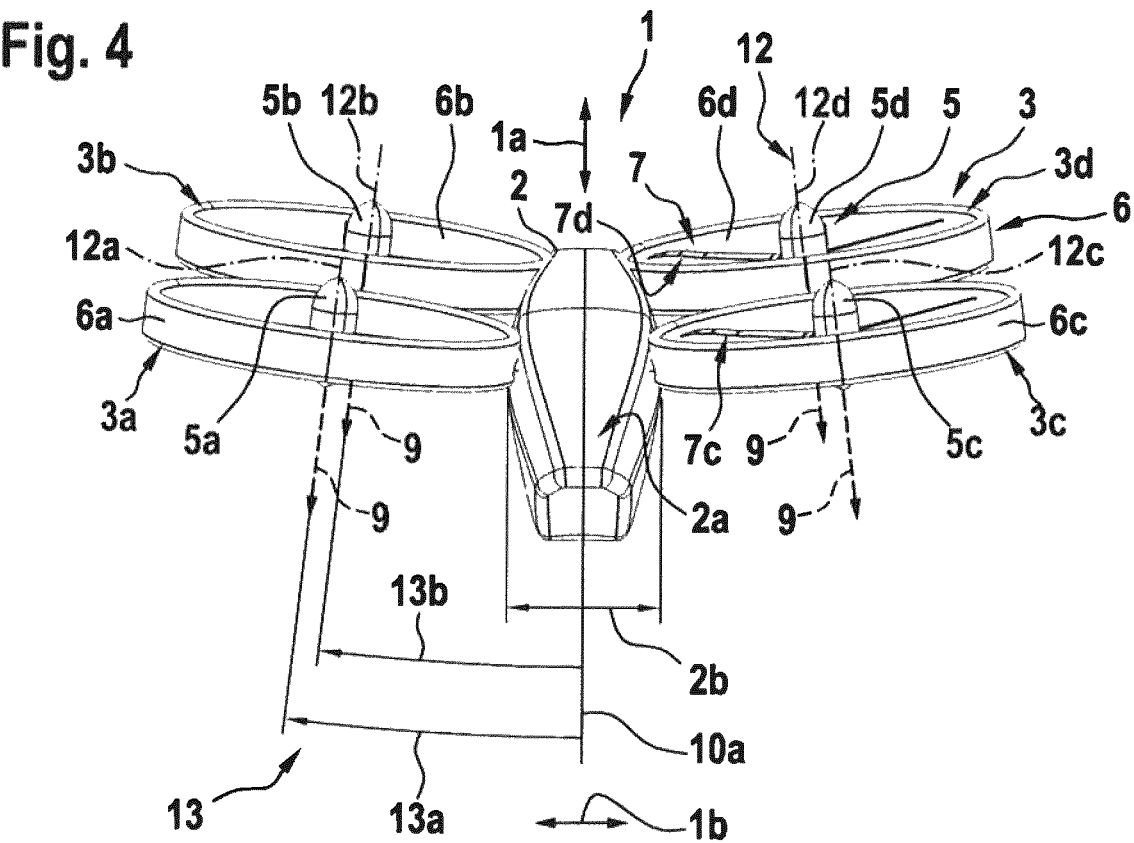
FIG. 4 shows a front view of the multirotor aircraft of FIG. 3.

FIG. 4 shows the multirotor aircraft 1 with the fuselage 2 of FIG. 3, which illustratively comprises a width 2b. The latter is defined as a maximum distance measured orthogonally to the longitudinal direction 1a of the multirotor aircraft 1 between the respective outmost left hand and right hand side surfaces of the fuselage 2.

According to FIG. 3, the multirotor aircraft 1 is shown in the exemplary failure-free operating mode, wherein the plurality of thrust producing units 3 produce thrust 9 by means of the plurality of upper and lower rotor assemblies 7, 8. The upper and lower rotor assemblies 7c, 8c define the rotor axis 12c and the upper and lower rotor assemblies 7d, 8d define the rotor axis 12d.

Furthermore, the upper and lower rotor assemblies 7a, 8a exemplarily define first and second congruent rotor axes, which are commonly referred to as the rotor axis 12a, and the upper and lower rotor assemblies 7b, 8b define first and second congruent rotor axes, which are commonly referred to as the rotor axis 12b. It should be noted that the rotor axes 12a, 12b, 12c, 12d are preferably implemented as described in order to reduce the overall complexity, system weight as well as geometrical size of the multirotor aircraft 1.

Preferably, the plurality of thrust producing units 3 is inclined in the lateral direction 1b of the multirotor aircraft 1 by a plurality of lateral inclination angles 13 in order to provide reduced gust sensitivity and to increase the maneuverability of the multirotor aircraft 1. The plurality of lateral inclination angles 13 is illustratively defined between the vertical reference line 10a of the multirotor aircraft 1 and the plurality of coaxially arranged rotor axes 12. Preferably, a possible and realized number of the plurality of lateral inclination angles 13 depends on an underlying number of provided thrust producing units.

More specifically, according to one aspect of the present invention, at least one of the plurality of thrust producing units 3 is inclined in the lateral direction 1b of the multirotor aircraft 1 by a first lateral inclination angle defined between the vertical reference line 10a of the multirotor aircraft 1 and the first and second congruent rotor axes of this at least one of the plurality of thrust producing units 3. The first lateral inclination angle is preferably comprised in a range between −45° and +80°, and preferentially amounts to 5°.

Illustratively, the thrust producing unit 3a of the plurality of thrust producing units 3 is inclined by a first lateral inclination angle 13a defined between the vertical reference line 10a and the rotor axis 12a, wherein the first lateral inclination angle 13a is preferably comprised in a range between −45° and +80°, and preferentially amounts to 5°. However, it should be noted that the thrust producing unit 3c of the plurality of thrust producing units 3 of FIG. 1 and FIG. 2 is preferably also inclined by the first lateral inclination angle 13a.

According to one aspect of the present invention, at least one of the plurality of thrust producing units 3 is inclined in the lateral direction 1b of the multirotor aircraft 1 by a second lateral inclination angle defined between the vertical reference line 10a of the multirotor aircraft 1 and the first and second congruent rotor axes of this at least one of the plurality of thrust producing units 3. The second lateral inclination angle is preferably comprised in a range between −45° and +80°, and preferentially amounts to 5°.

Illustratively, the thrust producing unit 3b of the plurality of thrust producing units 3 is inclined by a second lateral inclination angle 13b defined between the vertical reference line 10a and the rotor axis 12b, wherein the second lateral inclination angle 13b is preferably comprised in a range between −45° and +80°, and preferentially amounts to 5°. However, it should be noted that the thrust producing unit 3d of the plurality of thrust producing units 3 of FIG. 1 and FIG. 2 is preferably also inclined by the second lateral inclination angle 13b.

Figure 5:
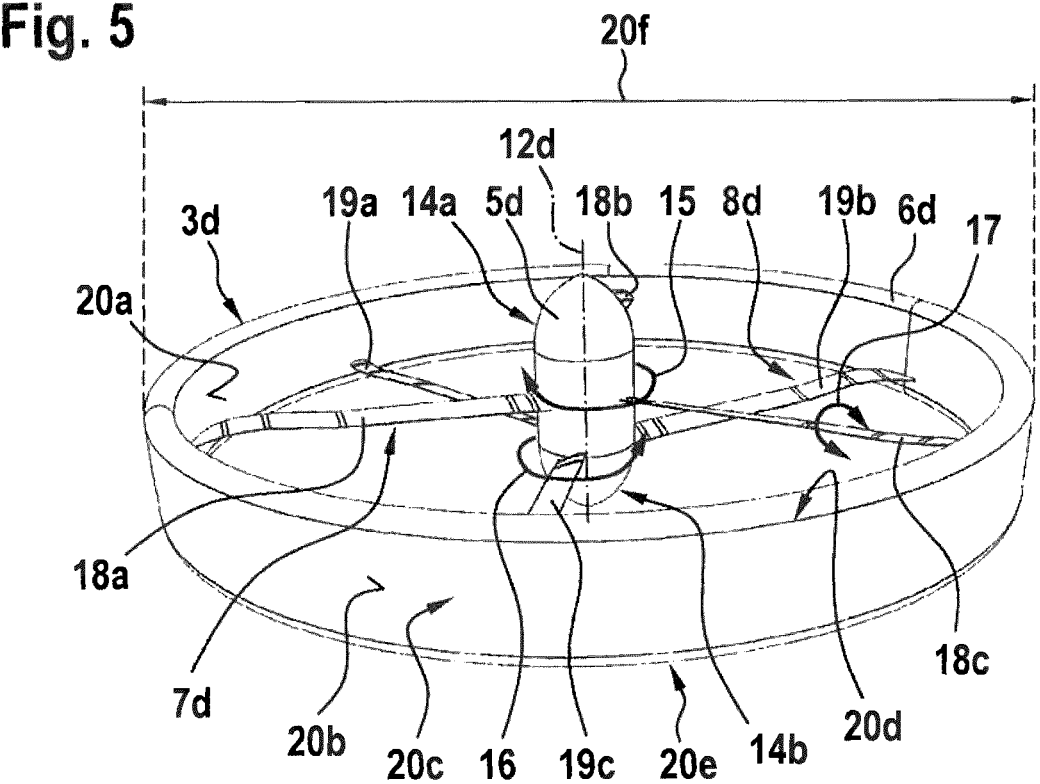
FIG. 5 shows a perspective view of a thrust producing unit of the multirotor aircraft of FIG. 1 to FIG. 4.

FIG. 5 shows the thrust producing unit 3d of the preceding figures, with its upper rotor assembly 7d, its lower rotor assembly 8d, its gearbox fairing 5d and its optional shrouding 6d for further illustrating an exemplary configuration thereof. It should, however, be noted that the thrust producing units 3a, 3b, 3c of the preceding figures preferably comprise similar configurations, so that the thrust producing unit 3d is only described representative for all thrust producing units 3a, 3b, 3c, 3d, for brevity and conciseness.

According to one aspect of the present invention, the upper rotor assembly 7d comprises at least two and, illustratively, three rotor blades 18a, 18b, 18c for producing thrust in operation. Similarly, the lower rotor assembly 8d preferably also comprises at least two and, illustratively, three rotor blades 19a, 19b, 19c for producing thrust in operation.

Furthermore, preferably at least one first engine 14a is provided for driving the rotor blades 18a, 18b, 18c, i.e. the upper rotor assembly 7d in operation and at least one second engine 14b is provided for driving the rotor blades 19a, 19b, 19c, i.e. the lower rotor assembly 8d in operation. The at least one first engine 14a is preferably associated with the aircraft operating structure described above with reference to FIG. 1, and the at least one second engine 14b is preferably associated with the redundant security architecture described above with reference to FIG. 1.

As illustrated on FIG. 5 for instance, embodiments of the invention provide with one first engine 14a having an upper location along the elevation direction 1c in the given thrust producing unit 3d, and one second engine 14b having a lower location along the elevation direction 1c in the thrust producing unit 3d. The upper first engine 14a and the lower first engine 14b of the same thrust producing unit form an upright dual motion source for the thrust producing unit 3d.

Having such upright dual motion source in at least some or in every thrust producing units 3a, 3b, 3c, 3d, 3x, 3y of the multiple aircraft 1, allows the invention providing a motion source redundant design increasing the safety multiple aircraft 1 in case of engine failure in one or in a plurality of thrust producing units.

As exposed with more details further on, in the case of failure of one of the upper first engine 14a or the lower first engine 14b in a given such upright dual motion source of a thrust producing unit 3a, 3b, 3c, 3d, 3x, 3y, the other non failed engine 14a or 14b is used to keep effective the thrust producing unit 3a, 3b, 3c, 3d, 3x, 3y and thus ensure flight continuity of the multiple aircraft 1.

Illustratively, the at least one first and second engines 14a, 14b are arranged inside of and, thus, encompassed by the gearbox fairing 5d.

It should be noted that optionally one or more gearboxes (28 in FIG. 8) can be introduced between the at least one first and second engines 14a, 14b and the rotor blades 18a, 18b, 18c respectively 19a, 19b, 19c. By such an optional introduction of one or more gearboxes, an operating efficiency of the at least one first and second engines 14a, 14b can be increased since their rotational speed is increased.

It should further be noted that the at least one first and second engines 14a, 14b can be implemented by any suitable engine that is capable of producing torque in operation, such as a turbine, diesel engine, Otto-motor, electrical engine and so on, and that can be connected to the rotor blades 18a, 18b, 18c respectively 19a, 19b, 19c for rotating these rotor blades 18a, 18b, 18c respectively 19a, 19b, 19c, i.e. the upper and lower rotor assemblies 7d respectively 8d, in operation. However, as such engines are well-known to the person skilled in the art and not part of the present invention they are not described in greater detail for brevity and conciseness.

Preferably, the upper rotor assembly 7d is adapted to be rotated in a first rotation direction 15 in operation. Similarly, the lower rotor assembly 8d is adapted to be rotated in a second rotation direction 16 in operation. Illustratively, the first and second rotation directions 15, 16 are opposed to each other.

According to one aspect of the present invention, at least the upper rotor assembly 7d and, more specifically, its rotor blades 18a, 18b, 18c, are provided with an optional pitch variation 17. Similarly, the rotor blades 19a, 19b, 19c of the lower rotor assembly 8d are preferably also provided with such an optional pitch variation. In this case, control of the produced thrust 9 of FIG. 3 and FIG. 4 can either be achieved in operation by means of pitch variation, by means of RPM variation or by means of a combination of pitch and RPM variation.

In contrast thereto, if the upper and lower rotor assemblies 7d, 8d are not provided with such an optional pitch variation, e. g. if the rotor blades 18a, 18b, 18c respectively 19a, 19b, 19c are implemented as fixed pitch blades, control of the produced thrust 9 of FIG. 3 and FIG. 4 in operation by means of pitch variation cannot by performed. In this case, only RPM variation can be used for control of the thrust 9 of FIG. 3 and FIG. 4 that is produced by the upper and lower rotor assembly 7d, 8d in operation.

According to one aspect of the present invention, each one of the upper and lower rotor assemblies 7d, 8d is individually sized and comprises a diameter 20f that ranges from 0.05 to 6 times of the fuselage width 2b of FIG. 4, which is designated as W hereinafter for simplicity. In other words, the diameter 20f of FIG. 4 preferably ranges from 0.05*W to 6*W, and preferentially amounts to 1.5*W.

Illustratively, the diameter 20f is defined by a diameter of an inner surface 20a of the optional shrouding 6d. The latter exemplarily further comprises an outer surface 20b and defines a leading edge 20d and a trailing edge 20e. Preferably, an internal volume 20c is defined between the inner surface 20a, the outer surface 20b, the leading edge 20d and the trailing edge 20e. This inner volume 20c can e. g. be used as storage volume for a battery system (25 in FIG. 7) of the multirotor aircraft 1 of the preceding figures.

FIG. 6 shows a schematic view of the thrust producing unit 3d of FIG. 5 with the upper and lower rotor assemblies 7d, 8d, which preferably define separated rotor planes 21, 22 in order to reach a required safety level and a satisfying flight mechanical behaviour. Illustratively, the rotor planes 21, 22 are arranged atop of each other.

The upper and lower rotor assemblies 7d, 8d are driven in operation by the at least one first and second engines 14a, 14b, respectively, which are arranged in the gearbox fairing 5d. As described above, the upper and lower rotor assemblies 7d, 8d preferably rotate around the rotor axis 12d that is commonly defined by a first rotor axis associated with the upper rotor assembly 7d and a second rotor axis 8d associated with the lower rotor assembly 8d.

According to one aspect of the present invention, these first and second rotor axes can be inclined by associated inclination angles 21a, 22a. The latter are preferably comprised in a range between −60° and +60°, and preferentially amount to 0°.

If, however, the associated inclination angles 21a, 22a are selected such that the rotor planes 21, 22 intersect, the upper and lower rotor assemblies 7d, 8d are intermeshing in operation. This may be allowable to actively rotate the at least one first and second engines 14a, 14b about the corresponding rotor planes 21, 22 in order to vary an underlying direction, i.e. vector of the thrust 9 produced according to FIG. 3 and FIG. 4. Alternatively, the rotor axis 12d as such can be inclined by one of the associated inclination angles 21a, 22a.

Figure 7:
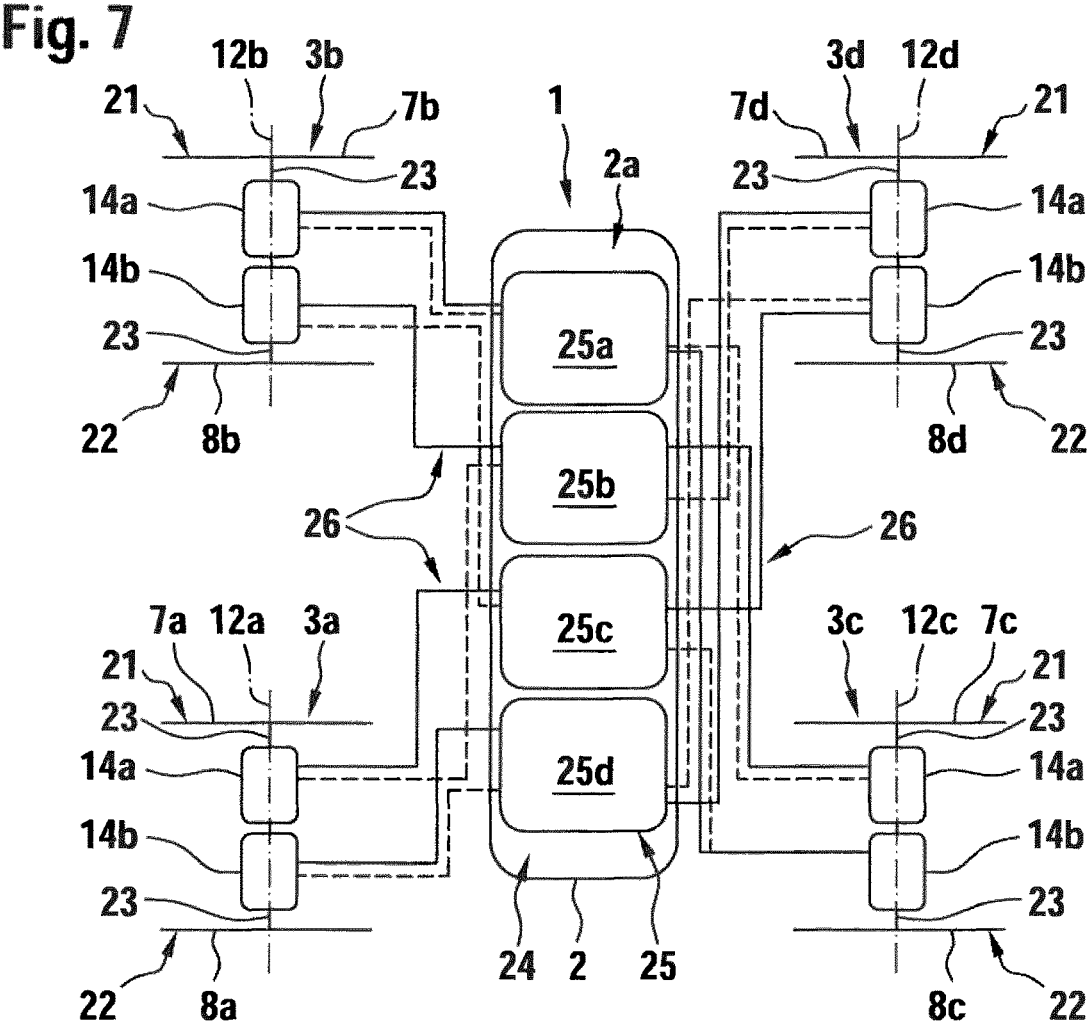
FIG. 7 shows a schematic view of the multirotor aircraft of FIG. 1 to FIG. 4 according to the present invention providing for each of four thrust producing units, two rotor/propeller planes positioned atop of each other each, one segregated electrical engine dedicated for driving one given of the two rotor/propeller planes and a connection between the segregated electrical engines and each of the multiple units (e.g. batteries) of the energy providing system, so as to form a fore/aft, up/down and left/right crossed redundant design increasing the safety level in case of failure.

FIG. 7 shows the multirotor aircraft 1 of the preceding figures in a simplified schematic representation for illustrating an exemplary energy storage and distribution system thereof. As described above, the multirotor aircraft 1 comprises the fuselage 2 and the thrust producing units 3a, 3b, 3c, 3d with the upper and lower rotor assemblies 7a, 8a; 7b, 8b; 7c, 8c; 7d, 8d, which respectively define the upper and lower rotor planes 21, 22 and which are driven in operation by their respective engines 14a, 14b, exemplarily via associated engine shafts 23.

On FIG. 7, the multirotor aircraft 1 has at least two, namely four thrust producing units 3a, 3x, 3c, 3d that form the aircraft operating structure including various rotor assemblies e.g. 7a, 7b, 7c and 7d.

Such thrust producing units are adapted for operation of the multirotor aircraft 1 in failure-free operating mode. The redundant security architecture including various rotor assemblies e.g. 8a, 8b, 8c, 8d, is at least adapted for operation of the multirotor aircraft 1 in case of a failure of operation in the aircraft operating structure including various rotor assemblies e.g. 7a, 7b, 7c, 7d.

The four thrust producing units 3a, 3b, 3c, 3d have each at least one first engine 14a provided for driving a respective first rotor assembly among the four rotor assemblies 7a, 7b, 7c, 7d, in operation. The second engines 14b provided are for respectively driving each a second one of the rotor assemblies 8a, 8b, 8c, 8d in operation. Thus, each first engine 14a is associated with the aircraft operating structure including the rotor assemblies 7a, 7b, 7c, 7d, and each second engine 14b is associated with the redundant security architecture including the rotor assemblies 8a, 8b, 8c, 8d.

Besides, the multirotor aircraft 1 has an energy storage system 24 comprising at least two energy providing units 25a, 25b, 25c, 25d. In FIG. 7, there is at least as much energy providing units than the multirotor aircraft 1 has thrust producing units 3a, 3b, 3c, 3d. But each of the energy providing units 25a, 25b, 25c and 25d is not dedicated to one given thrust producing unit 3a, 3b, 3c, 3d.

In fact, at least one thrust producing unit 3a, 3b, 3c, 3d of the aircraft operating structure is associated with at least two energy providing units 25a, 25b, 25c, 25d. Another energy providing unit among units 25a, 25b, 25c, 25d is associated with at least two thrust producing units 3a, 3b, 3c, 3d of the redundant security architecture.

The multirotor aircraft 1 of FIG. 7 has an energy storage system 24 comprising an engine energy transmission arrangement 26. E.g. on FIG. 11, the energy storage system 24 comprises one engine energy transmission arrangement 26 and distribution devices 36.

The engine energy transmission arrangement 26 and distribution devices 36 are handling sometimes in parallel, the functional cooperation of each thrust producing units with the energy providing units. Thus at least another of the energy providing units is possibly functionally cooperating with the distribution devices 36 to provide energy to one first engine at the given side, and a further energy providing unit is possibly also functionally cooperating with the distribution devices 36 to provide energy to one second engine at the respective opposed side of the fuselage, e.g. in case of failure.

According to one aspect of the present invention, the multirotor aircraft 1 comprises an energy storage system 24, which comprises at least two and, illustratively, four energy providing units 25a, 25b, 25c, 25d for security and redundancy. More specifically, the energy storage system 24 preferentially comprises a battery system 25, wherein the energy providing units 25a, 25b, 25c, 25d are defined by associated battery units.

It should be noted that the energy storage system 24 is generally provided for supplying energy to the at least one first and second engines 14a, 14b of the thrust producing units 3a, 3b, 3c, 3d in operation. Consequently, the energy storage system 24 may comprise any kind of energy supply means that comprise not only battery units, but also e. g. fuel tanks and so on.

The energy storage system 24 is preferably and illustratively accommodated in the fuselage 2. However, it may alternatively e. g. be divided and accommodated in the plurality of optional shrouding units 6 of FIG. 1.

Preferably, at least a first one of the energy providing units 25a, 25b, 25c, 25d is connected to the at least one first engine 14a of at least one of the thrust producing units 3a, 3b, 3c, 3d for providing energy to this at least one first engine 14a in operation, while at least a second one of the energy providing units 25a, 25b, 25c, 25d is connected to the at least one second engine 14b of the at least one of the thrust producing units 3a, 3b, 3c, 3d for providing energy to the at least one second engine 14b in operation. In this configuration, the at least first one of the energy providing units 25a, 25b, 25c, 25d is associated with the aircraft operating structure described above with reference to FIG. 1, and the at least second one of the energy providing units 25a, 25b, 25c, 25d is associated with the redundant security architecture described above with reference to FIG. 1.

More specifically, the energy providing unit 25a is preferably connected via an associated engine energy transmission arrangement 26 (e.g. electrically conductive wiring, optical power transponder . . . ), as illustrated with dashed lines, to the at least one first engine 14a of the thrust producing units 3b and 3c. Similarly, the energy providing unit 25b is preferably connected via the associated engine energy transmission arrangement 26, as also illustrated with dashed lines, to the at least one first engine 14a of the thrust producing units 3a and 3d. The energy providing unit 25c is preferably connected via the associated engine energy transmission arrangement 26, as also illustrated with dashed lines, to the at least one second engine 14b of the thrust producing units 3b and 3c. Finally, the energy providing unit 25d is preferably connected via the associated engine energy transmission arrangement 26, as also illustrated with dashed lines, to the at least one second engine 14b of the thrust producing units 3a and 3d.

Thus, according to one aspect of the present invention, in failure-free operating mode of the multirotor aircraft 1 only the upper rotor assemblies 7a, 7b, 7c, 7d of the thrust producing units 3a, 3b, 3c, 3d are powered by the energy providing units 25a, 25b, which corresponds to a failure-free operating mode by means of the aircraft operating structure. Consequently, in this case the aircraft operating structure is defined by the upper rotor assemblies 7a, 7b, 7c, 7d of the thrust producing units 3a, 3b, 3c, 3d with their respective at least one first engines 14a and the energy providing units 25a, 25b.

However, in case of a failure of the upper rotor assemblies 7a, 7b, 7c, 7d and/or the energy providing units 25a, 25b, i.e. a failure of the aircraft operating structure, the lower rotor assemblies 8a, 8b, 8c, 8d of the thrust producing units 3a, 3b, 3c, 3d can be powered by the energy providing units 25c, 25d, which corresponds to a failure operating mode by means of the redundant security architecture, in order to avoid e. g. a crash of the multirotor aircraft 1. Consequently, in this case the redundant security architecture is defined by the lower rotor assemblies 8a, 8b, 8c, 8d of the thrust producing units 3a, 3b, 3c, 3d with their respective at least one second engines 14b and the energy providing units 25c, 25d.

It should, however, be noted that the above configuration is merely described by way of example and not for limiting the invention accordingly. Instead, various other configurations can be implemented, which are suitable for realizing the aircraft operating structure and the redundant security architecture according to the present invention. However, in all such configurations each one of the energy providing units 25a, 25b, 25c, 25d is preferably used to power at least two different thrust producing units of the thrust producing units 3a, 3b, 3c, 3d, which are arranged at opposed sides of the fuselage 2.

For instance, according to an exemplary alternative aspect of the present invention and as illustrated with continuous lines, the energy providing unit 25a can be connected via the associated engine energy transmission arrangement 26 to the at least one first engine 14a of the thrust producing unit 3b and to the at least one second engine 14b of the thrust producing unit 3c. Similarly, the energy providing unit 25b can be connected via the associated engine energy transmission arrangement 26 to the at least one first engine 14a of the thrust producing unit 3c and to the at least one second engine 14b of the thrust producing unit 3b. Furthermore, the energy providing unit 25c can be connected via the associated engine energy transmission arrangement 26 to the at least one first engine 14a of the thrust producing unit 3a and to the at least one second engine 14b of the thrust producing unit 3d.

Finally, the energy providing unit 25d can be connected via the associated engine energy transmission arrangement 26 to the at least one first engine 14a of the thrust producing unit 3d and to the at least one second engine 14b of the thrust producing unit 3a. In this case, the energy providing units 25a, 25b are used to power the thrust producing units 3b, 3d and the energy providing units 25c, 25d are used to power the thrust producing units 3a, 3c. Thus, the energy providing units 25c, 25d with the thrust producing units 3a, 3c would define the aircraft operating structure and the energy providing units 25a, 25b with the thrust producing units 3b, 3d would define the redundant security architecture.

Figure 8:
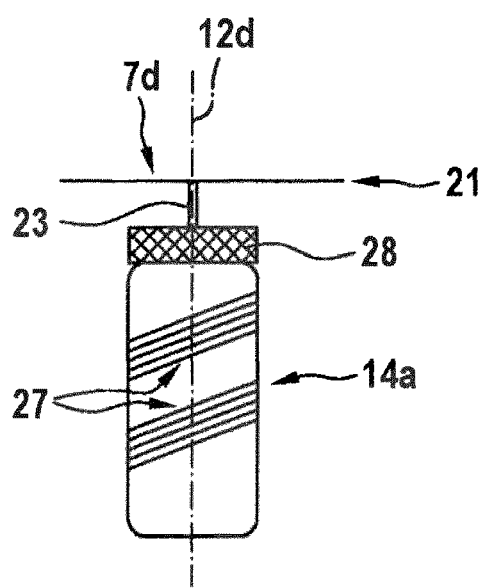
FIG. 8 shows a segregated engine of the thrust producing unit of FIG. 5 and FIG. 6 according to an embodiment of the present invention.

FIG. 8 shows the at least one first engine 14a of the preceding figures, which is provided for rotating the upper rotor assembly 7d of the preceding figures around the rotor axis 12d. According to one aspect of the present invention, the at least one first engine 14a defines a single segregated electrical engine that comprises at least two separate electric coils 27.

The at least two separate electric coils 27 are preferably adapted to provide electrical power independent from each other in operation. In this case, at least a first one of the electric coils is associated with the aircraft operating structure described above with reference to FIG. 1 and adapted for providing energy in failure-free operating mode, and at least a second one of the electric coils 27 is associated with the redundant security architecture described above with reference to FIG. 1 and adapted for providing energy in case of a failure of the at least first one of the electric coils 27.

According to one aspect of the present invention, the upper rotor assembly 7d is connected to the at least one first engine 14a via the engine shaft 23 and a reduction gearbox 28. The latter is suitable to increase a rotational speed of the upper rotor assembly 7d in operation.

Figure 9:
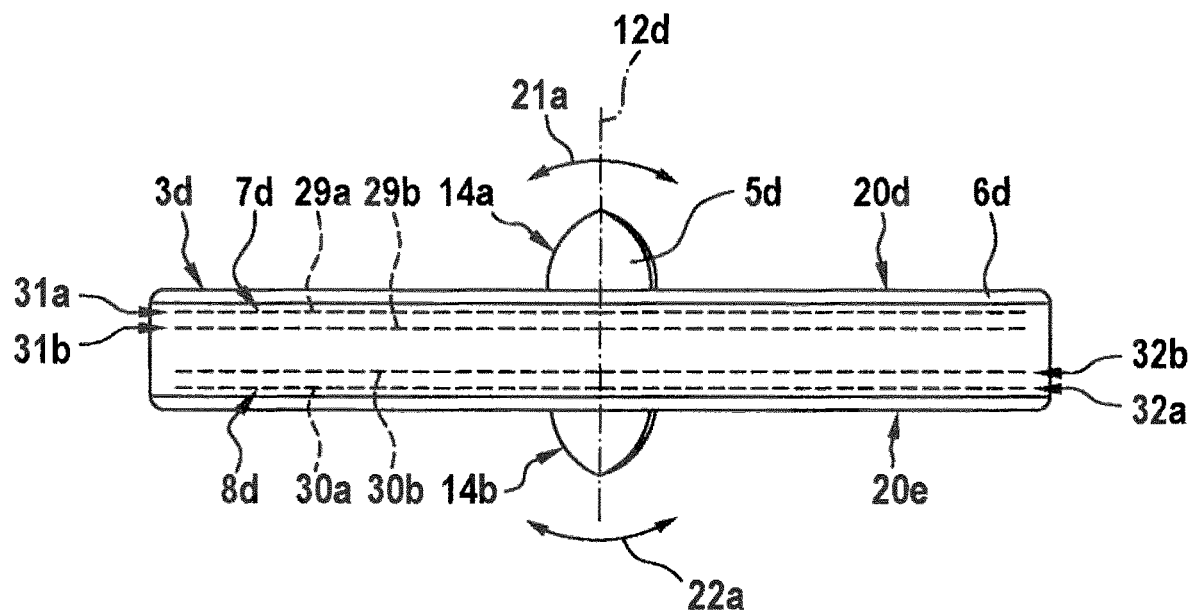
FIG. 9 shows a partly transparent side view of a thrust producing unit according to an alternative embodiment of the present invention.

FIG. 9 shows the thrust producing unit 3d of FIG. 6 with the upper and lower rotor assemblies 7d, 8d. However, in contrast to FIG. 6, the upper rotor assembly 7d now preferably comprises at least one first and one second upper rotor assembly 29a, 29b, while the lower rotor assembly 8d preferably comprises at least one first and one second lower rotor assembly 30a, 30b.

The at least one first and second upper rotor assemblies 29a, 29b preferably define respective first and second upper rotor planes 31a, 31b, while the at least one first and second lower rotor assemblies 30a, 30b preferably define respective first and second lower rotor planes 32a, 32b. Consequently, in this case at least four separate rotor planes 31a, 31b, 32a, 32b are provided. This allows to further increase a provided safety level and a satisfying flight mechanical behaviour.

Figure 10:
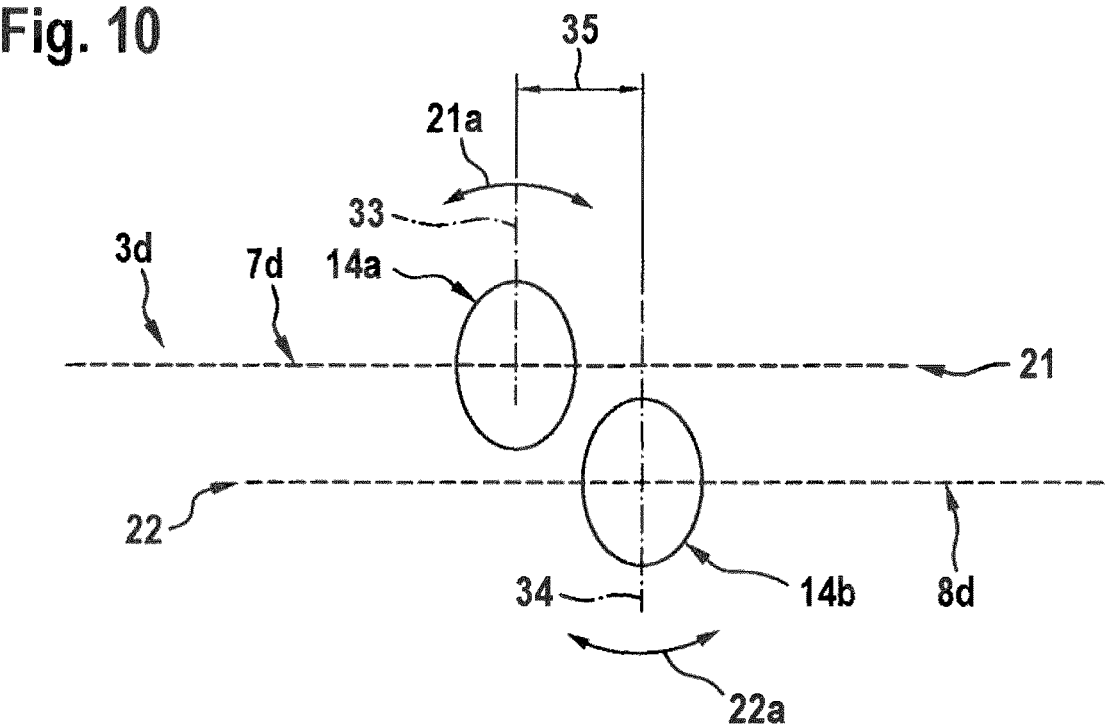
FIG. 10 shows a schematic view of a thrust producing unit according to still another alternative embodiment of the present invention.

FIG. 10 shows a schematic view of the thrust producing unit 3d of FIG. 5 with the upper and lower rotor assemblies 7d, 8d, which preferably define the separated rotor planes 21, 22. The upper and lower rotor assemblies 7d, 8d are driven in operation by the at least one first and second engines 14a, 14b. The at least one first engine 14a is preferably adapted to rotate the upper rotor assembly 7d around a first, upper rotor axis 33 and the at least one second engine 14b is preferably adapted to rotate the lower rotor assembly 8d around a second, lower rotor axis 34.

In contrast to FIG. 5, however, the first and second rotor axes 33, 34 are spaced apart, i.e. distanced from each other by a predetermined rotor axis displacement 35. This displacement 35 can be directed in the longitudinal direction 1a of the multirotor aircraft 1 of the preceding figures and/or in its lateral direction 1b.

Figure 11:
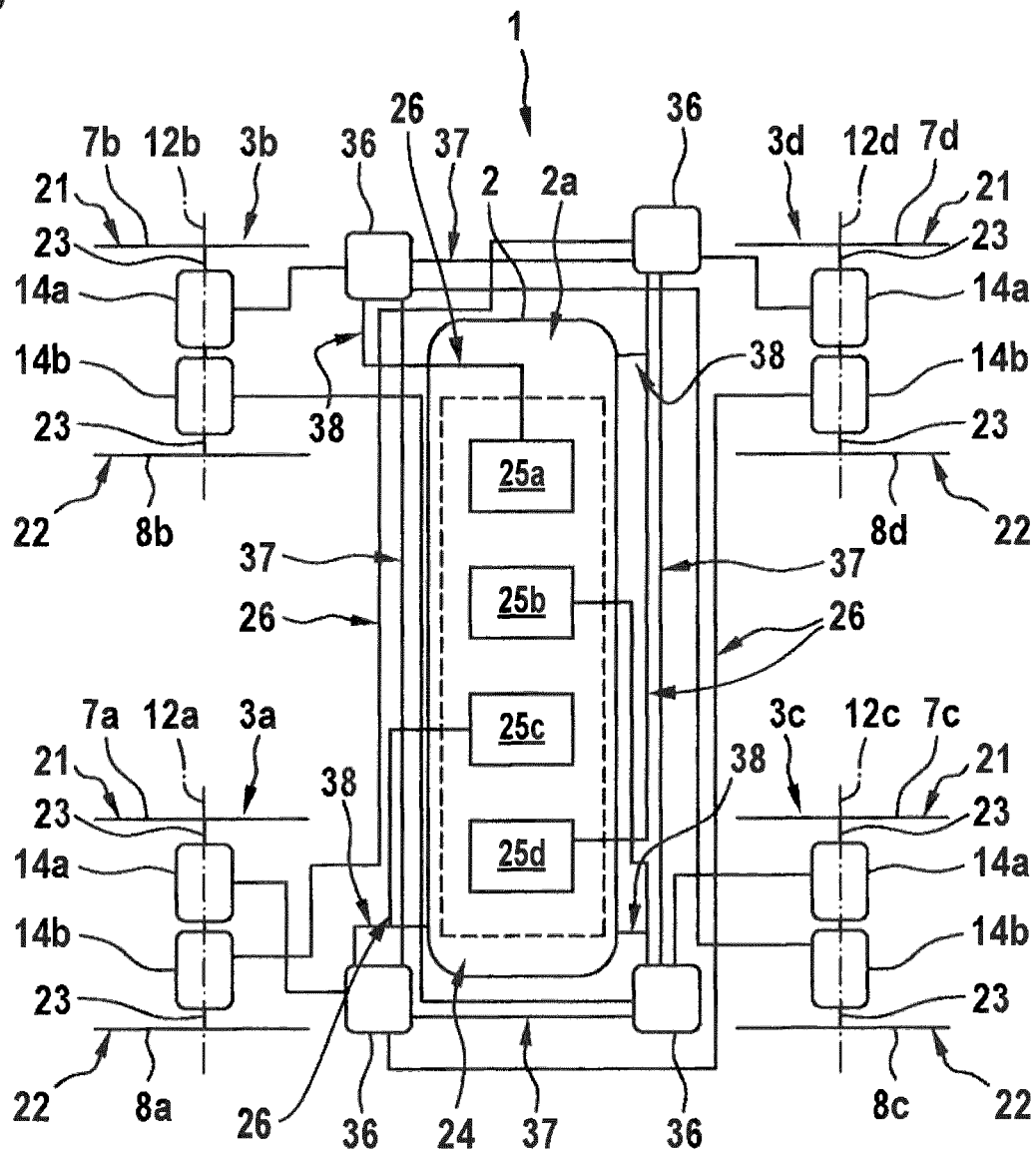
FIG. 11 shows a schematic view of the multirotor aircraft of FIG. 4 according to an embodiment of the present invention providing at least one energy distribution device for each thrust producing unit and a redundant connection adapted to offer an actively variable (fore/aft and/or up/down and/or left/right) crossed redundant dispatch of thrust and energy, so as to increase safety in case of failure by real-time dispatch of thrust and energy.

FIG. 11 shows the multirotor aircraft 1 of the preceding figures in a simplified schematic representation with the energy storage system 24 of FIG. 7. Further to provisions of FIG. 7, energy distribution devices 36 are introduced between the energy providing units 25a, 25b, 25c, 25d and the thrust producing units 3a, 3b, 3c, 3d for further increasing an underlying security level of the multirotor aircraft 1.

Embodiments of the invention merge the energy distribution devices 36 as per FIG. 11 with the energy transmission arrangements 26 as per FIG. 7.

Referring to FIG. 11, at least two of the energy providing units 25a, 25b, 25c, 25d are accommodated for example in the fuselage 2. Other embodiments provide energy units in one or a plurality of thrust units and/or in appendix systems removably attached to the fuselage 2 but not included in this fuselage. The energy storage system 24 comprises energy distribution devices 36 that are connected between one of the energy providing units 25a, 25b, 25c, 25d and one of the thrust producing units 3a, 3b, 3c, 3d.

On FIG. 11, the multirotor aircraft 1 has as much energy providing units 25a, 25b, 25c, 25d than the corresponding multirotor aircraft 1 has thrust producing units 3a, 3b, 3c, 3d, i.e. at least four. The multirotor aircraft 1 of FIG. 11 also has as much energy providing units than there are energy distribution devices 36 in the corresponding energy storage system 24.

The energy distribution devices 36 are connected to respective ones of the energy providing units 25a, 25b, 25c, 25d by means of an associated energy storage transmission arrangement 38 and they are interconnected with each other by means of an associated distribution energy transmission arrangement 37 (e.g. wiring, optical power transponder . . . ). According to one aspect of the present invention, each one of the distribution devices 36 provides energy to at least two opposed ones of the thrust producing units 3a, 3b, 3c, 3d.

The energy distribution devices 36 are adapted to at least one of right left side/right side, frontward/rearward and upwards/downwards crossed redundant dispatching of thrust or energy in the multirotor aircraft 1, e.g. in case of engine or energy source failure.

At least one of the energy providing units, e.g. 25a, of FIG. 7 or 11 is associated to at least one thrust producing unit e.g. 3c at a left side of the fuselage 2 in a forward transverse pair 3a-3c of thrust producing units relatively to at least one of a respectively rearward transverse pair 3b-3d of thrust producing units. The energy providing unit e.g. 25a, is also associated to at least another thrust producing unit at a right side of the fuselage 2 in the rearward transverse pair of thrust producing units.

At least another of the energy providing units e.g. 25b, is associated to at least a further thrust producing unit e.g. 3a at a right side of the fuselage 2 in the forward transverse pair of thrust producing units relatively to the at least one rearward transverse pair of thrust producing units 3x-3y, 3b-3d. The other energy providing unit e.g. 25b is also associated to at least a further thrust producing unit e.g. 3d at a left side of the fuselage 2 in the at least one rearward transverse pair of thrust producing units. Thus, the thrust producing units 3a, 3b, 3c, 3d are here respectively associated in a manner to be opposed one another, relatively to the longitudinal direction 1a and to the lateral direction 1b of the fuselage 2.

In the multirotor aircraft 1 of FIG. 7 or 11, at least one of the energy providing units 25a, 25b, 25c, 25d is associated to a first engine 14a in a thrust producing unit 3a, 3b, 3c, 3d at a given side of the fuselage 2. The at least one energy providing unit 25a, 25b, 25c, 25d is also associated to a second engine 14b in another thrust producing unit 3a, 3b, 3c, 3d at a respective opposed side of the fuselage 2, i.e. a side that is opposed to the given side, relatively to the longitudinal direction 1a of the fuselage 2. At least another of the energy providing units 25a, 25b, 25c, 25d is associated to the first engine 14a at the given side, and a further energy providing unit 25a, 25b, 25c, 25d is also associated to the second engine 14b at the respective opposed side of the fuselage 2.

The multirotor aircraft 1 of FIG. 7 or 11 is such that the thrust producing unit 3a, 3b, 3c, 3d at the given side of the fuselage 2 is in one given transverse pair of thrust producing units. The given transverse pair is distinct from another transverse pair of thrust producing units 3a, 3b, 3c, 3d. The other transverse pair is shifted longitudinally along the longitudinal direction 1a of the fuselage 2 respectively the given transverse pair.

The multirotor aircraft 1 of FIG. 12 is such that the multirotor aircraft 1 comprises an odd number of transverse pairs along the longitudinal direction 1a of the fuselage 2.

FIG. 12 also shows a top view of a multirotor aircraft 1 similar to the one of FIG. 1, but having more than four thrust producing units 3. The fore end of the multirotor aircraft 1 of FIG. 12 is on the left hand, the aft end of the multirotor aircraft being on the right hand. Thus, the right side of the multirotor aircraft 1 is illustrated on the upper portion of FIG. 12, and the left side of the multirotor aircraft 1 is illustrated on the lower portion.

In the multirotor aircraft 1 of FIG. 12 at least one intermediate transverse pair 3x-3y of thrust producing units is arranged between two other transverse pairs of thrust producing units 3a-3c, 3b-3d that are respectively longitudinally shifted along the longitudinal direction 1a relatively the intermediate transverse pair 3x-3y.

A given energy providing unit among the various units is associated to the first engine 14a at one given side of the intermediate transverse pair and an other energy providing unit among the various units is associated to the first engine 14a of the intermediate transverse pair at an opposed side to the given side, relatively the longitudinal direction 1a. The other energy providing unit among the various units is also associated to the second engine 14b at the given side of the intermediate transverse pair and the given energy providing unit among the various units is associated to the second engine 14b of the intermediate transverse pair on the opposed side to the given side.

From FIG. 12 the aircraft 1 includes thrust producing units 3a, 3x, 3b and 3c, 3y, 3d that are connected to the fuselage 2. The thrust producing units 3a, 3x, 3b and 3c, 3y, 3d respectively comprise the upper rotor assemblies 7a, 7x, 7b, 7c, 7y, 7d and lower rotor assemblies 8a, 8x, 8b, 8c, 8y, 8d, which are also arranged in a side-by-side configuration with congruent rotor axes as per example of axes 12 in FIG. 3 and FIG. 4.

As per example of FIG. 12, the thrust producing units 3a, 3x, 3b, 3c, 3y, 3d are all arranged laterally with respect to the fuselage 2, i.e. on the left or right side of the fuselage 2 seen in its longitudinal direction 1a from the rear.

According to the example of FIG. 12, the aircraft 1 comprises an energy storage system equivalent to the system 24 of the other embodiments. For security and redundancy, the energy storage system of FIG. 12 comprises energy providing units equivalent to the ones of the other embodiments. For instance, the energy storage system of FIG. 12 comprises at least six energy providing units.

The example of FIG. 12 provides that the energy storage system preferentially comprises an electrical power system, e.g. such as a battery or the like. The energy providing units are defined by associated electrical power units. In such a case, such an energy storage system is for instance provided for supplying energy to at least one first and second engines of the thrust producing units 3a, 3x, 3b, 3c, 3y, 3d in operation. In other embodiments, the energy storage system of FIG. 12 comprises various kinds of energy supply means that comprise not only battery units, e.g. fuel tanks, electric generators, or other power sources compliant with aeronautics requirements.

The energy storage system 24 is illustratively accommodated in the fuselage 2. However, it may alternatively e. g. be divided and accommodated in the plurality of optional shrouding units 6 of FIG. 1.

Similarly to previous embodiments, the inventive association feeds with energy the thrust producing units 3a, 3x, 3b, 3c, 3y, 3d of the embodiment of FIG. 12 in failure-free operating mode (normal operation) and in case of failure of the aircraft operating structure in a redundant manner.

Having multiple power sources, thrust sources and motion sources (e.g. engines) that can be instantly activated and possibly operated in an exchangeable manner e.g. in case of failure in one given structure, allows for the inventive combination/correlation of: at least two individual rotor assemblies, a redundant, segregated power source layout, a redundant power supply and harness layout, a physical separation and segregation of an underlying power management, redundant, segregated electrical engines, and possibly pitch control and/or RPM control of the rotor assemblies 7 and 8.

In the example of FIG. 13, the aircraft operating structure is adapted for operation of the aircraft 1 in failure-free operating mode. The redundant security architecture is at least adapted for operation of the aircraft 1 in case of a failure of the aircraft operating structure in operation. Similarly to previous examples, the redundant security architecture is thus provided to comply with applicable authority regulations and certification requirements regarding passenger transportation.

FIG. 13 provides for at least one of the at least two thrust producing units to comprise each, two rotor assemblies.

As exposed before, each one of the at least two rotor assemblies defines an associated rotor plane, similar to the planes 21, 22 on FIGS. 6 and 10. A first one of these rotor assemblies (e.g. 7d) is associated with the aircraft operating structure and a second of the rotor assemblies is associated with the redundant security architecture.

FIG. 13 also provides for at least one first engine to be provided for driving the first one of the at least two rotor assemblies in operation and at least one second engine is provided for driving the second one of the at least two rotor assemblies in operation. The at least one first engine is associated with the aircraft operating structure and the at least one second engine is associated with the redundant security architecture.

Although this is not depicted, the embodiment of FIG. 13 includes associating, connecting and energy supplying either as per FIG. 7 and/or FIG. 11. For instance, in accordance with FIG. 11, energy distribution devices (e.g. similar to engine 36) are introduced between the energy providing units and the thrust producing units 3a, 3b, 3c, 3d for further increasing an underlying security level of the aircraft 1.

The fuselage 2 shown on FIG. 13 also has an elevation length in elevation direction 1c and a Center of Gravity CoGP of the whole multirotor aircraft 1.

The Center of Gravity CoGP is located inside the Fuselage 2. The center of gravity CoGP further forms the barycenter of a crossing propulsion volume CPV.

On FIG. 13, the crossing propulsion volume CPV extends over a longitudinal dimension Rx extending along the longitudinal direction 1a, over a transverse dimension Ry extending along the lateral direction 1b and over an elevation dimension Rz extending along the elevation direction (1b).

In the embodiment of FIG. 13, the longitudinal dimension Rx is comprised between 0.01 to 0.9 times the longitudinal dimension Lx. The transverse dimension Ry is comprised between 0.01 to 0.9 times the transverse length Wy. The elevation dimension Rz is comprised between −2 to +2 times the elevation length Ez. Thus, the dimensions of the crossing propulsion volume CPV are ranges of the corresponding lengths of the fuselage 2, with the crossing propulsion volume CPV encompassing the center of gravity CoGP.

On FIG. 13, the at least two thrust producing units 3a, 3b, 3c, 3d are arranged in a crosslink opposed layout. One of the at least two thrust producing units is arranged relatively another, in crossed sideward, length ward locations at crosslink opposed positions on a respective crossing propulsion axis AX1, AX2, AY1, AY2, and AZ1, AZ2, such that all the crossing propulsion axis meet together inside the crossing propulsion volume CPV. The crossing propulsion axis AX1, AX2, AY1, AY2, and AZ1, AZ2 thus meet at locations as close as possible to the center of gravity CoGP.

Figure 14:
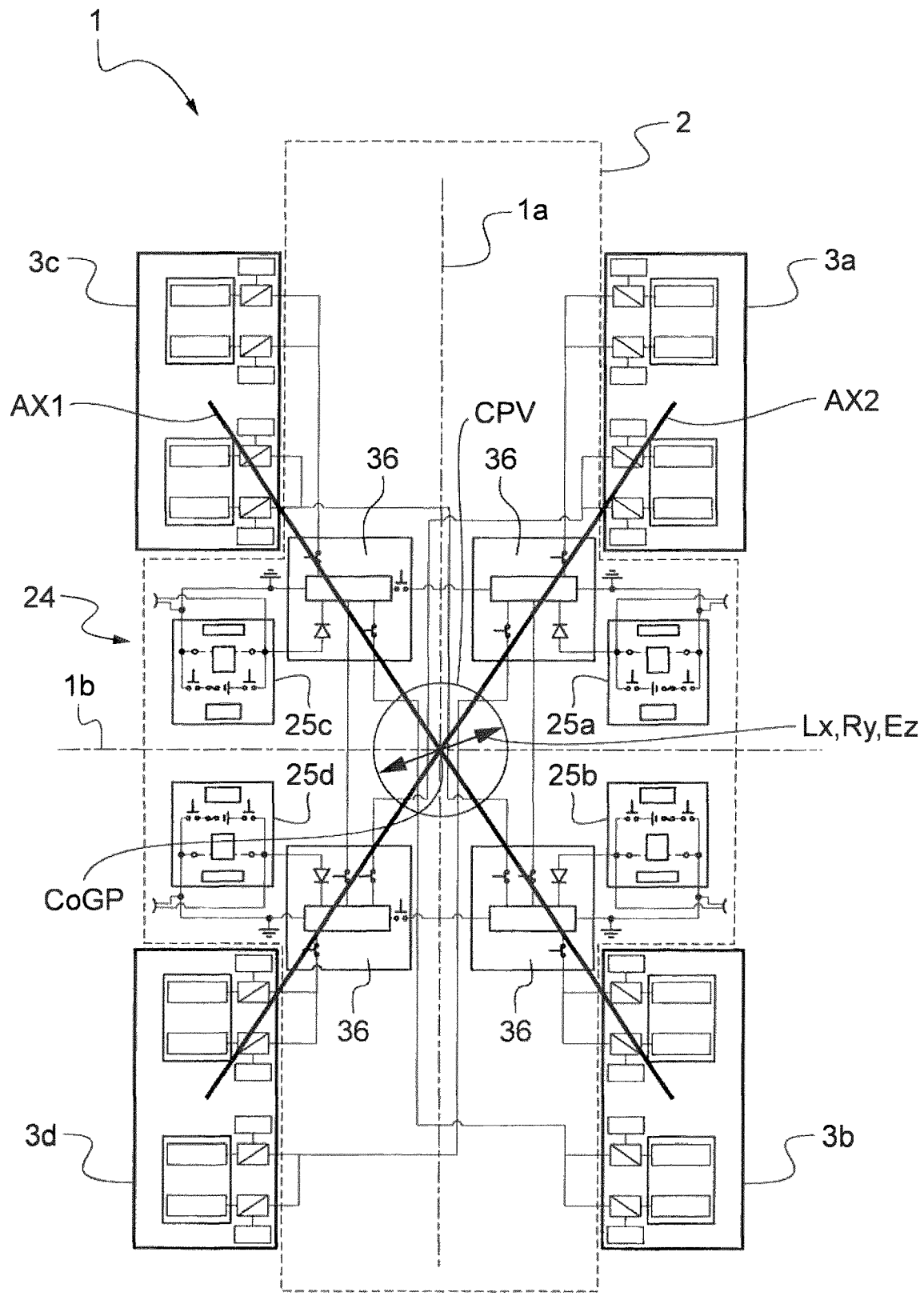
FIG. 14 shows an embodiment of multirotor aircraft having four thrust producing units, outwardly extending from a fuselage in which four energy providing units are accommodated, the four thrust producing units and the four energy providing units being connected via a redundancy crossed scheme.

Now referring to FIG. 14, the at least one first engine 14a in one of the at least two thrust producing units 3a, 3b, 3c, 3d on a given side of the fuselage 2 is arranged in a redundant and segregated layout relatively with the second engine 14b of the other of the at least two thrust producing units 3a, 3b, 3c, 3d on the other side opposed to the given side.

The at least one first engine 14a and second engine 14b are arranged in crossed upward/downward locations at crosslink opposed positions on the respective crossing propulsion axis AX1, AX2. Each of the at least one first engine 14b and second engine 14a is arranged outside the crossing propulsion volume CPV.

In the embodiments of FIGS. 14 and 15, at least some of the at least two energy providing units 25a, 25b, 25c, 25d are arranged within the crossing propulsion volume CPV. Other embodiments provide at least some distinct energy providing units that are arranged outside the crossing propulsion volume CPV, e.g. units located in at least some of the thrust units.

In such embodiments, the thrust producing units 3a-3c, 3h-3g, 3x-3y, 3f-3e, 3b-3d are arranged in cooperating couples in a redundant and segregated layout with one of the at least two thrust producing units relatively another, in crossed sideward, length ward locations at crosslink opposed positions on a respective crossing propulsion axis. As per FIG. 13, all crossing propulsion axis meet together inside the crossing propulsion volume CPV.

Thus, the at least one first engine 14b and second engine 14a of one thrust producing unit on a given left/right side is arranged in cooperating couple in a redundant and segregated layout relatively with the other thrust respective first or second engine of another producing unit, in crossed upward/downward locations at crosslink opposed positions on the respective crossing propulsion axis.

The energy distribution devices 36 and/or the energy transmission devices 26, 37, 38 connect at least two energy providing units 25a, 25b, 25c, 25d to at least two thrust producing units 3a, 3x, 3b, 3c, 3y, 3d that are arranged one relatively another in crossed sideward, length ward and possibly up-downward locations defined by opposed positions on a respective crossing propulsion axis AX01, AX02, AX03

FIG. 14 shows an embodiment of multirotor aircraft 1 having four thrust producing units 3a, 3b, 3c and 3d, outwardly extending from the fuselage 2 in which four energy providing units 25a, 25b, 25c and 25d are accommodated.

The four thrust producing units and the four energy providing units of FIG. 14 are connected with a mutual crossed scheme of virtual associating lines AX1, AX2 in a plane orthogonal to the elevation direction 1c, AY1, AY2 in a plane orthogonal to the lateral direction 1b, and AZ1, AZ2 in a plane orthogonal to the longitudinal direction 1a, so as to cross each other quite close to the center of gravity CoGP inside the crossing propulsion volume CPV.

FIG. 15 shows various embodiments of multirotor aircraft 1 having respectively (from top to bottom, from left hand to right hand) two transverse pairs of thrust producing units 3a-c and 3b-3d, three transverse pairs of thrust producing units 3a-c, 3x-3y, 3x-y, 3b-d, four transverse pairs of thrust producing units 3a-c, 3g-3h, 3x-y, 3b-d, and five pairs of thrust producing units 3a-c, 3g-3h, 3x-y, 3b-d, 3e-f.

Here again, each transverse pair outwardly extends from one lateral side of the fuselage 2 to the opposed side, in a redundancy cross link arrangement.

For each of the embodiments of FIG. 15, the longitudinal length, transverse length and elevation length of the crossing propulsion volume define a crossing area in which the cross virtual associating lines AX1, AX2, AX3, AX4, AX5 cross each other close to the center of gravity CoGP that is within the crossing propulsion volume.

From FIG. 15, the multirotor aircraft 1 offers safe dispatching central pattern for fore/aft and/or up/down and/or left/right crossed redundant dispatching of thrust and energy.

REFERENCE LIST

1 Multirotor aircraft
1a Aircraft longitudinal direction
1b Aircraft lateral direction
2 Aircraft airframe
2a Aircraft airframe internal volume
2b Aircraft airframe width 3 Thrust producing units
3a, 3x, 3b, 3c, 3y, 3d Thrust producing unit
4 Thrust producing units structural supports
4a, 4x, 4b, 4c, 4y, 4d Thrust producing unit structural support
5 Gearbox fairings
5a, 5x, 5b, 5c, 5y, 5d Gearbox fairing
6 Shrouding units
6a, 6x, 6b, 6c, 6y, 6d Shrouding
7 Upper rotor assemblies
7a, 7x, 7b, 7c, 7y, 7d Upper rotor assembly
8 Lower rotor assemblies
8a, 8x, 8b, 8c, 8y, 8d Lower rotor assembly
9 Thrust
10 Ground
10a vertical resp. perpendicular reference line
11 Longitudinal inclination angles
11a, 11b Longitudinal inclination angle
12 Rotor axes
12a, 12b, 12c, 12d Rotor axis
13 Lateral inclination angles
13a, 13b Lateral inclination angle
14a Upper rotor assembly engine
14b Lower rotor assembly engine
15 Upper rotor assembly rotation direction
16 Lower rotor assembly rotation direction
17 Pitch variation
18a, 18b, 18c Upper rotor assembly rotor blade
19a, 19b, 19c Lower rotor assembly rotor blade
20a Shrouding inner surface
20b Shrouding outer surface
20c Shrouding internal volume
20d Shrouding leading edge
20e Shrouding trailing edge
20f Shrouding inner diameter resp. rotor assembly diameter
21 Upper rotor assembly rotor plane
21a Upper plane inclination angle
22 Lower rotor assembly rotor plane
22a Lower plane inclination angle
23 Engine shaft
24 Energy storage system
25 Battery system
25a, 25b, 25c, 25d Battery unit
26 Engine energy transmission arrangement (e.g. wiring, optical power transponder . . . )
27 Electric coils
28 Reduction gearbox
29a, 29b First and second upper rotor assemblies
30a, 30b First and second lower rotor assemblies
31a, 31b First and second upper rotor assemblies rotor planes
32a, 32b First and second lower rotor assemblies rotor planes
33 Upper rotor assembly rotor axis
34 Lower rotor assembly rotor axis
35 Rotor axis displacement
36 Energy distribution devices
37 Distribution energy transmission arrangement (e.g. wiring, optical power transponder . . . )
38 Energy storage energy transmission arrangement (e.g. wiring, optical power transponder . . . )
AX1, AX2, AX3, AX4, AX5, AY1, AY2, AZ1, AZ2 crossing propulsion axis
CoGP Center of Gravity
CPV crossing propulsion volume
Lx longitudinal length of the fuselage
Rx longitudinal dimension of the CPV
Wy transverse length of the fuselage
Ry transverse dimension of the CPV
Ez elevation length of the fuselage
Rz elevation dimension of the CPV.

The invention claimed is:

1. A multirotor aircraft having a fuselage that defines an internal volume adapted for transportation of passengers; the multirotor aircraft having a plurality of thrust producing units structurally connected to the fuselage;
the multirotor aircraft being designed with a normal operating mode and with a failure operating mode; the multirotor aircraft has an aircraft operating structure that is adapted for failure-free operation of the multirotor aircraft in the normal operating mode, and a redundant security architecture that is at least adapted for the failure operating mode of the multirotor aircraft in case of a failure of the aircraft operating structure in operation,
wherein the multirotor aircraft having at least two thrust producing units of the plurality of thrust producing units comprising at least two rotor assemblies structurally connected to the fuselage specifically by a structural support, each one of the at least two rotor assemblies defining an associated rotor plane, a first one of the at least two rotor assemblies being associated with the aircraft operating structure for failure-free operation and a second one of the at least two rotor assemblies being associated with the redundant security architecture for the failure operating mode,
at least one first engine being electrical and provided in the at least two thrust producing units for driving a first one of at least two rotor assemblies in operation, and at least one second engine being electrical and provided in the at least two thrust producing units for driving a second one of the at least two rotor assemblies at least in operation, the at least one first engine being associated with the aircraft operating structure and the at least one second engine being associated with the redundant security architecture,
the internal volume of the fuselage of the multirotor aircraft having an energy storage system; the energy storage system being electrical and comprising at least two electrical energy providing units; and
at least a first one of the at least two electrical energy providing units is connected to the at least one first engine for providing energy to the at least one first engine in operation, and
at least a second one of the at least two electrical energy providing units is connected to the at least one second engine for providing energy to the at least one second engine in operation,
wherein the multirotor aircraft comprises an odd number of transverse pairs of thrust producing units along the longitudinal direction of the fuselage, and at least one intermediate transverse pair of thrust producing units is arranged between two other transverse pairs of thrust producing units that are respectively longitudinally shifted along the longitudinal direction relatively the intermediate transverse pair,
the multirotor aircraft comprising at least a given energy providing unit, and an other energy providing unit,
the given energy providing unit being associated to the first engine at one given side of the intermediate transverse pair and the other energy providing unit being associated to the first engine of the intermediate transverse pair at an opposed side to the given side, relatively the longitudinal direction, and the other energy providing unit being associated to the second engine at the given side of the intermediate transverse pair and the given energy providing unit being associated to the second engine of the intermediate transverse pair on the opposed side to the given side.

2. The multirotor aircraft according to claim 1, wherein the fuselage extends along a longitudinal direction from a front to an aft of the fuselage and along a lateral direction from a left side to a right side of the fuselage;

the multirotor aircraft having at least four thrust producing units that are arranged in transverse pairs, each transverse pair being arranged along the lateral direction respectively with one thrust producing units on the left side of the fuselage and one thrust producing units on the right side, so that at least two thrust producing units are arranged on the right side of the fuselage and at least two other thrust producing units are arranged on the left side of the fuselage.

3. The multirotor aircraft according to claim 2, wherein at least one of the energy providing units is associated to at least one thrust producing unit at a left side of the fuselage in a forward transverse pair of thrust producing units relatively to at least one of a respectively rearward transverse pair of thrust producing units and the energy providing unit is also associated to at least another thrust producing unit at a right side of the fuselage in the rearward transverse pair of thrust producing units, at least another of the energy providing units being associated to at least a further thrust producing unit at a right side of the fuselage in the forward transverse pair of thrust producing units relatively to the rearward transverse pair of thrust producing units, the other energy providing unit being also associated to the thrust producing unit at a left side of the fuselage in the rearward transverse pair of thrust producing units, and so that the thrust producing units are respectively associated in a manner to be opposed one another relatively to the longitudinal direction and to the lateral direction of the fuselage.

4. The multirotor aircraft according to claim 2, wherein at least one of the energy providing units is associated to a first engine in a thrust producing unit at a given side of the fuselage, the later energy providing unit also being associated to the second engine at the respective opposed side of the fuselage.

5. The multirotor aircraft according to claim 1, wherein the first one of the at least two rotor assemblies defines a first rotor axis and the second one of the at least two rotor assemblies defines a second rotor axis, the first and second rotor axes being spaced apart from each other.

6. The multirotor aircraft according to claim 1, wherein the first one of the at least two rotor assemblies defines a first rotor axis and the second one of the at least two rotor assemblies defines a second rotor axis, the first and second rotor axes being coaxially arranged.

7. The multirotor aircraft according to claim 6, wherein the first and second rotor axes are inclined by associated inclination angles comprised in a range between −60° and +60°.

8. The multirotor aircraft according to claim 6, wherein the at least one of the at least two thrust producing units is inclined in longitudinal direction of the multirotor aircraft by an associated longitudinal inclination angle defined between a vertical reference line of the multirotor aircraft and the first and second rotor axes, the associated longitudinal inclination angle being comprised in a range between −45° and +80°.

9. The multirotor aircraft according to claim 8, wherein at least one other thrust producing unit is provided that is inclined in longitudinal direction of the multirotor aircraft by another longitudinal inclination angle defined between the vertical reference line and first and second rotor axes of the at least one other thrust producing unit, the other longitudinal inclination angle being comprised in a range between −45° and +80°.

10. The multirotor aircraft according to claim 9, wherein the at least one of the at least two thrust producing units is inclined in lateral direction of the multirotor aircraft by an associated lateral inclination angle defined between a vertical reference line of the multirotor aircraft and the first and second rotor axes, the associated lateral inclination angle being comprised in a range between −45° and +80°.

11. The multirotor aircraft according to claim 10, wherein at least one other thrust producing unit is provided that is inclined in lateral direction of the multirotor aircraft by another lateral inclination angle defined between the vertical reference line and first and second rotor axes of the at least one other thrust producing unit, the other lateral inclination angle being comprised in a range between −45° and +80°.

12. The multirotor aircraft according to claim 1, wherein the first one of the at least two rotor assemblies is adapted to be rotated in a first rotation direction in operation and the second one of the at least two rotor assemblies is adapted to be rotated in a second rotation direction in operation, the first rotation direction being opposed to the second rotation direction.

13. The multirotor aircraft according to claim 1, wherein the energy storage system comprises energy distribution devices that are operatively connected between the energy providing units and the thrust producing units, the multirotor aircraft having a number of energy distribution devices that is at least the same of the number of the thrust producing units, each of the energy distribution devices being operatively connected to a sole respective energy providing unit by a single associated energy storage transmission arrangement and the energy distribution devices are interconnected with each other by an associated distribution transmission arrangement.

14. The multirotor aircraft according to claim 13, wherein the at least one first and second engines define a single electrical engine that comprises at least two separate electric coils, the at least two separate electric coils being adapted to provide electrical power independent from each other in operation, wherein at least one first electric coil is associated with the aircraft operating structure and at least one second electric coil is associated with the redundant security architecture.

15. The multirotor aircraft according to according to claim 1, wherein the energy storage system comprising at least as many energy providing units as the multirotor aircraft has thrust producing units, wherein at least a first one of the at least two energy providing units is connected to the at least one first engine for providing energy to the at least one first engine in operation and at least a second one of the at least two energy providing units is connected to the at least one second engine for providing energy to the at least one second engine in operation, wherein the at least first one of the energy providing units is associated with the aircraft operating structure and the second one of the at least two energy providing units is associated with the redundant security architecture.

16. The multirotor aircraft according to claim 15, wherein the energy storage system comprises a battery system, wherein the at least two energy providing units are defined by associated battery units.

17. The multirotor aircraft according to according to claim 1,
wherein the fuselage is extended along a longitudinal length in the longitudinal direction, a transverse length in the lateral direction and an elevation length in an elevation direction of the multirotor aircraft;
the multirotor aircraft having a center of gravity, the center of gravity forming the barycenter of a crossing propulsion volume,
the crossing propulsion volume being extended over a longitudinal dimension extending on 0.01 to 0.9 times the longitudinal length of the fuselage along the longitudinal direction, over a transverse dimension extending on 0.01 to 0.9 times the transverse length of the fuselage along the lateral direction and an over elevation dimension extending on −2 to +2 times the elevation length of the fuselage along the elevation direction; the crossing propulsion volume encompassing the center of gravity,
at least two energy providing units being arranged within the crossing propulsion volume, the at least two thrust producing units being arranged in a layout with one of the at least two thrust producing units relatively another, in crossed sideward, length ward locations at crosslink opposed positions on a respective crossing propulsion axis, all the crossing propulsion axis meeting together inside the crossing propulsion volume.

18. The multirotor aircraft according to claim 17,
wherein the at least one first engine in one of the at least two thrust producing units on a given side of the fuselage is arranged in a redundant and segregated layout relatively with the second engine of the other of the at least two thrust producing units on the other side opposed to the given side,
the at least one first engine and second engine being arranged in crossed upward/downward locations at crosslink opposed positions on the respective crossing propulsion axis and
each of the at least one first engine and second engine being arranged outside the crossing propulsion volume.

19. The multirotor aircraft according to claim 1, wherein the at least one of the at least two thrust producing units comprises an associated shrouding, the at least two rotor assemblies being accommodated in the associated shrouding.

20. The multirotor aircraft according to claim 1, wherein the at least two thrust producing units have each a gearbox fairing, and the first and second engines of each of the thrust producing units are arranged inside of the gearbox fairing so as to be encompassed by the gearbox fairing.

21. A multirotor aircraft having a fuselage that defines an internal volume; the multirotor aircraft having a plurality of thrust producing units connected to the fuselage;
the multirotor aircraft having a normal operating mode and with a failure operating mode; the multirotor aircraft has an aircraft operating structure adapted for failure-free operation of the multirotor aircraft in the normal operating mode, and a redundant security architecture adapted for the failure operating mode of the multirotor aircraft,
the multirotor aircraft has at least two thrust producing units of the plurality of thrust producing units comprising at least two rotor assemblies connected to the fuselage specifically by a structural support, each one of the at least two rotor assemblies defining an associated rotor plane, a first one of the at least two rotor assemblies being associated with the aircraft operating structure for failure-free operation and a second one of the at least two rotor assemblies being associated with the redundant security architecture for the failure operating mode,
at least one first engine being electrical and provided in the at least two thrust producing units for driving a first one of at least two rotor assemblies in operation, and at least one second engine being electrical and provided in the at least two thrust producing units for driving a second one of the at least two rotor assemblies at least in operation, the at least one first engine being associated with the aircraft operating structure and the at least one second engine being associated with the redundant security architecture,
the internal volume of the fuselage of the multirotor aircraft having an energy storage system; the energy storage system being electrical and comprising at least two electrical energy providing units; and
at least a first one of the at least two electrical energy providing units is connected to the at least one first engine for providing energy to the at least one first engine in operation, and
at least a second one of the at least two electrical energy providing units is connected to the at least one second engine for providing energy to the at least one second engine in operation,
the multirotor aircraft comprising at least a given energy providing unit, and an other energy providing unit,
the given energy providing unit being associated to the first engine at one given side of the intermediate transverse pair and the other energy providing unit being associated to the first engine of the intermediate transverse pair at an opposed side to the given side, relatively the longitudinal direction, and
the other energy providing unit being associated to the second engine at the given side of the intermediate transverse pair and the given energy providing unit being associated to the second engine of the intermediate transverse pair on the opposed side to the given side.

* * * * *